(12) United States Patent
Saggar et al.

(10) Patent No.: US 12,574,930 B2
(45) Date of Patent: Mar. 10, 2026

(54) COHERENT PUCCH FORMAT FOR THE TIME-DOMAIN SINGLE-CARRIER WAVEFORM

(71) Applicant: QUALCOMM Incorporated, San Diego, CA (US)

(72) Inventors: Hemant Saggar, San Diego, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 476 days.

(21) Appl. No.: 18/157,032

(22) Filed: Jan. 19, 2023

(65) Prior Publication Data

US 2024/0251413 A1     Jul. 25, 2024

(51) Int. Cl.
| | |
|---|---|
| *H04W 72/21* | (2023.01) |
| *H04L 5/00* | (2006.01) |
| *H04W 72/0446* | (2023.01) |

(52) U.S. Cl.
CPC ........... *H04W 72/21* (2023.01); *H04L 5/0048* (2013.01); *H04W 72/0446* (2013.01)

(58) Field of Classification Search
CPC .. H04W 72/21; H04W 72/0446; H04L 5/0048
See application file for complete search history.

(56) References Cited

U.S. PATENT DOCUMENTS

2018/0331807 A1   11/2018   Kim et al.
2020/0044796 A1   2/2020   Yang et al.

| | | | |
|---|---|---|---|
| 2021/0367729 A1* | 11/2021 | Huang .................. | H04L 5/0051 |
| 2023/0023719 A1* | 1/2023 | Ji ........................... | H04W 16/28 |
| 2023/0054155 A1* | 2/2023 | Saggar .................. | H04W 72/21 |
| 2023/0156715 A1* | 5/2023 | Saggar .................. | H04L 1/1896 |
| | | | 370/329 |

FOREIGN PATENT DOCUMENTS

WO     2023107810 A1    6/2023

OTHER PUBLICATIONS

International Search Report and Written Opinion—PCT/US2023/084962—ISA/EPO—Apr. 19, 2024.
Moderator (NTT Docomo, Inc): "Summary on Rel-17 NR TEI Related Discussion", R1-2105955, 3rd Generation Partnership Project, Mobile Competence Centre, 650, Route Des Lucioles, F-06921 Sophia-antipolis Cedex, France, vol. RAN WG1, No. e-Meeting, May 10, 2021-May 27, 2021, May 27, 2021, 63 Pages, XP052015696, p. 8, Proposal 2 and the paragraph under this proposal, p. 9, Fig. 1, p. 40, sec. 2.10.

* cited by examiner

*Primary Examiner* — Kent Krueger
(74) *Attorney, Agent, or Firm* — Procopio, Cory, Hargreaves & Savitch LLP

(57) ABSTRACT

Aspects presented herein may enable a UE to transmit a PUCCH formed by a flexible concatenation of different types of blocks, such as one or more data sample blocks, one or more RS blocks, and/or one or more gap blocks within a PUCCH symbol. In one aspect, a UE receives, from a network entity, an indication to transmit one or more PUCCH symbols that are associated with a coherent PUCCH format, where each PUCCH symbol of the one or more PUCCH symbols associated with the coherent PUCCH format includes at least one RS sample block, at least one data sample block, or at least one gap sample block multiplexed in time-domain. The UE transmits, for the network entity, the one or more PUCCH symbols.

28 Claims, 20 Drawing Sheets

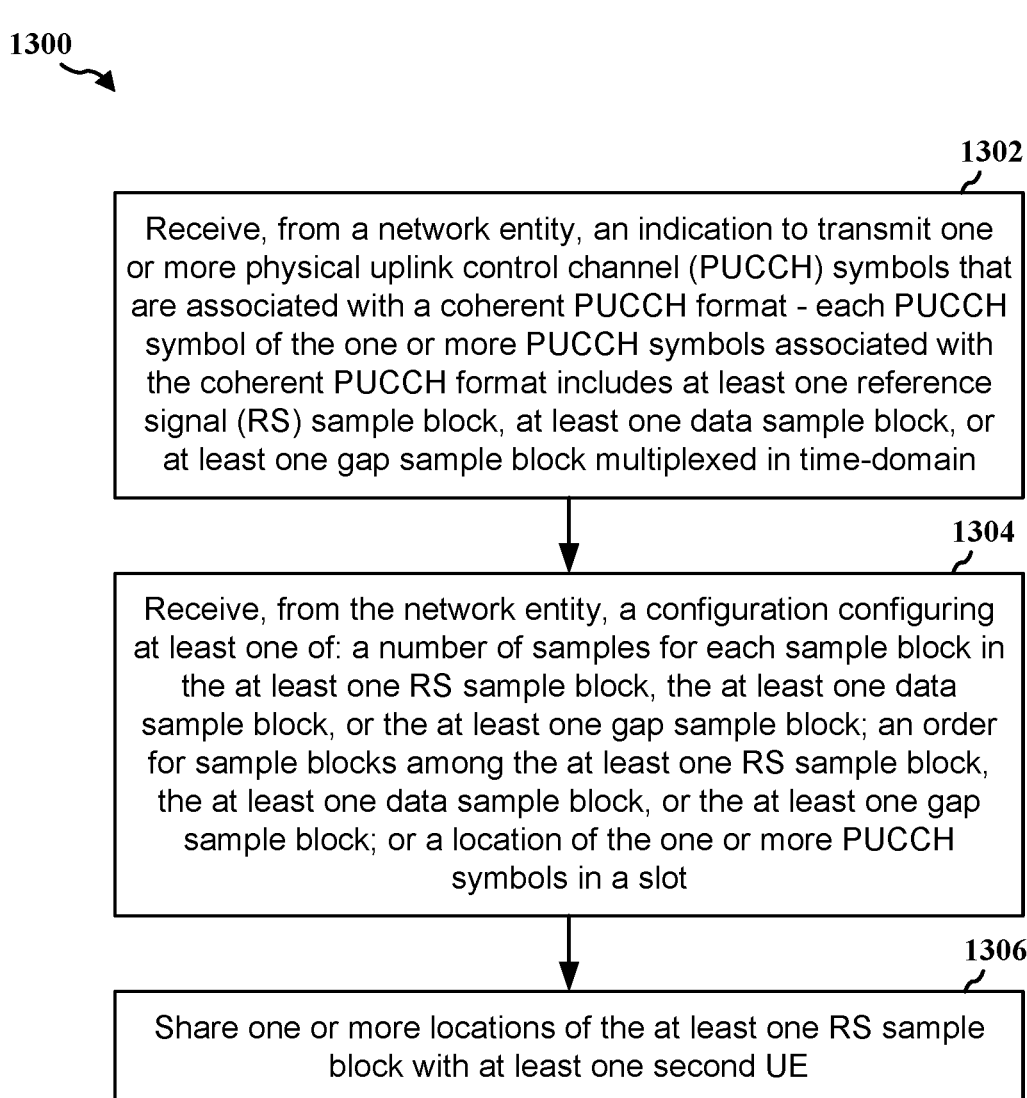

1302

Receive, from a network entity, an indication to transmit one or more physical uplink control channel (PUCCH) symbols that are associated with a coherent PUCCH format - each PUCCH symbol of the one or more PUCCH symbols associated with the coherent PUCCH format includes at least one reference signal (RS) sample block, at least one data sample block, or at least one gap sample block multiplexed in time-domain

1304

Receive, from the network entity, a configuration configuring at least one of: a number of samples for each sample block in the at least one RS sample block, the at least one data sample block, or the at least one gap sample block; an order for sample blocks among the at least one RS sample block, the at least one data sample block, or the at least one gap sample block; or a location of the one or more PUCCH symbols in a slot

1306

Share one or more locations of the at least one RS sample block with at least one second UE

1308

Receive, from the network entity, additional RS sample block allocations based on being configured to share the one or more locations of the at least one RS sample block with the at least one second UE

1310

Transmit, for the network entity, the one or more PUCCH symbols

FIG. 13

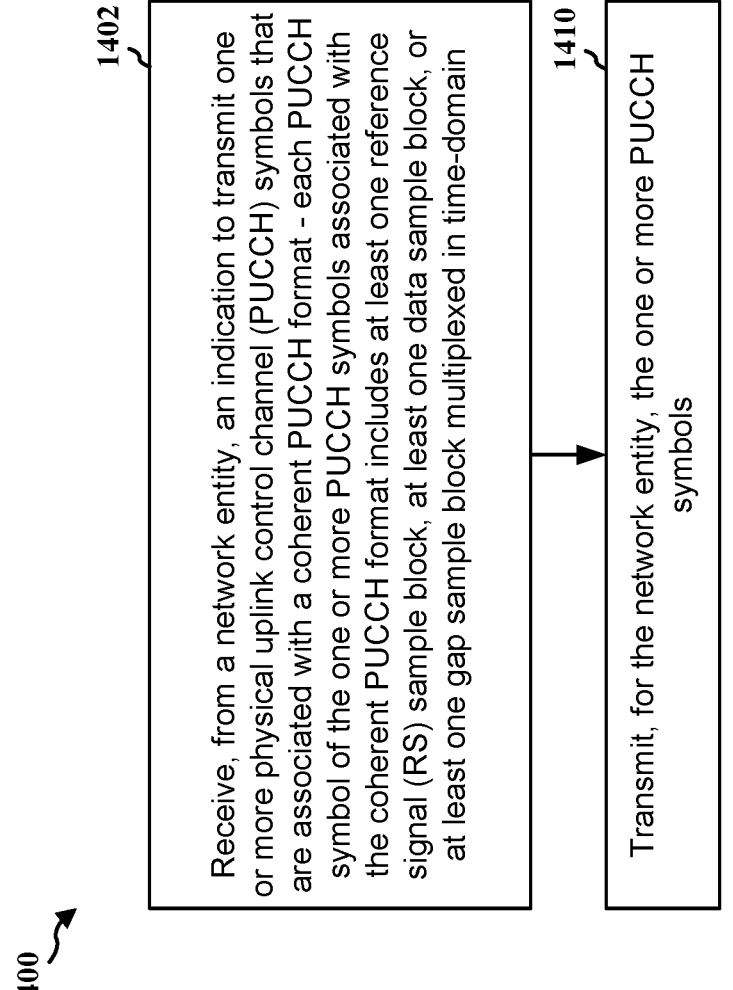

1400

1402

Receive, from a network entity, an indication to transmit one or more physical uplink control channel (PUCCH) symbols that are associated with a coherent PUCCH format - each PUCCH symbol of the one or more PUCCH symbols associated with the coherent PUCCH format includes at least one reference signal (RS) sample block, at least one data sample block, or at least one gap sample block multiplexed in time-domain

1410

Transmit, for the network entity, the one or more PUCCH symbols

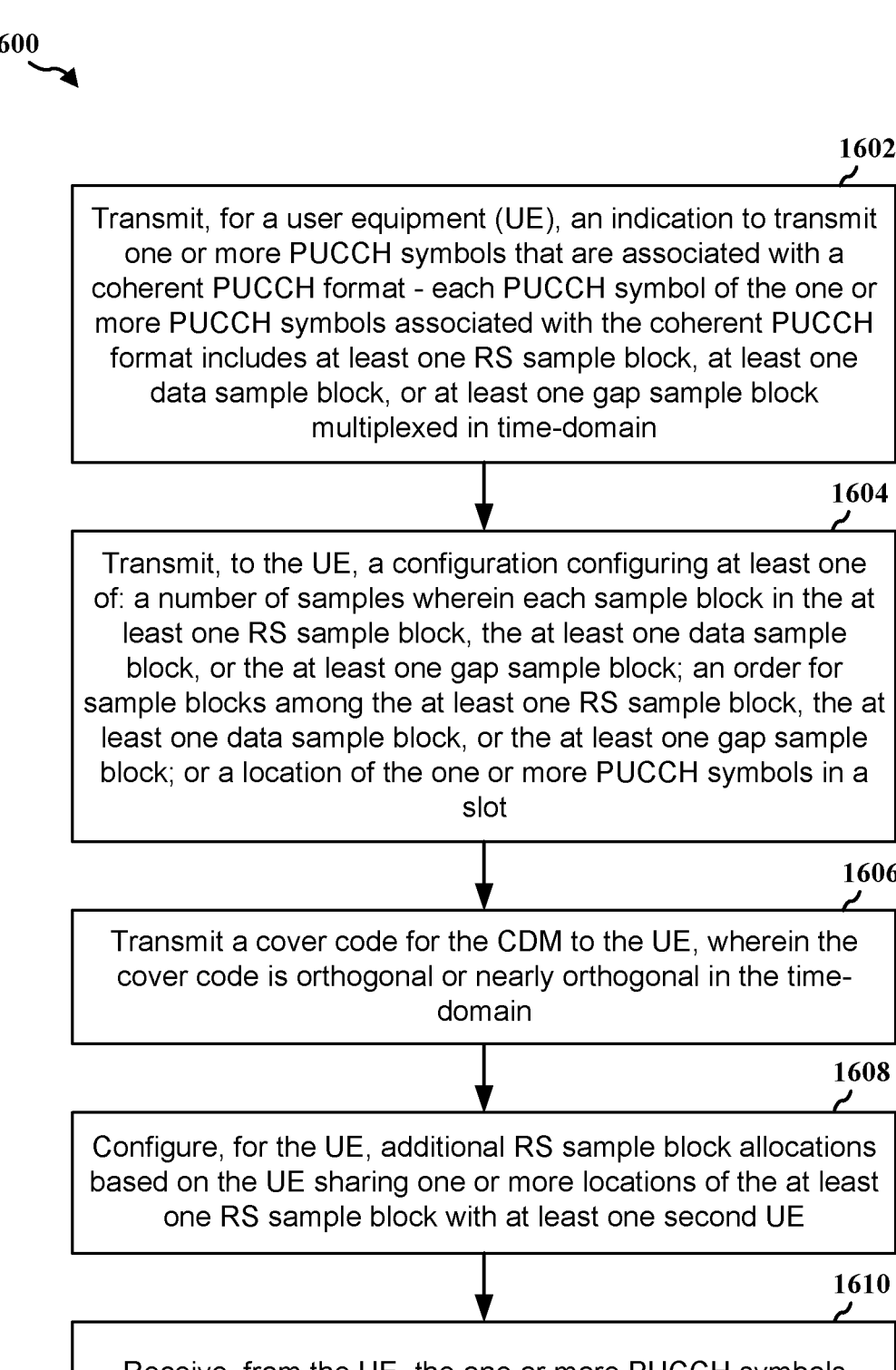

1602

Transmit, for a user equipment (UE), an indication to transmit one or more PUCCH symbols that are associated with a coherent PUCCH format - each PUCCH symbol of the one or more PUCCH symbols associated with the coherent PUCCH format includes at least one RS sample block, at least one data sample block, or at least one gap sample block multiplexed in time-domain

1604

Transmit, to the UE, a configuration configuring at least one of: a number of samples wherein each sample block in the at least one RS sample block, the at least one data sample block, or the at least one gap sample block; an order for sample blocks among the at least one RS sample block, the at least one data sample block, or the at least one gap sample block; or a location of the one or more PUCCH symbols in a slot

1606

Transmit a cover code for the CDM to the UE, wherein the cover code is orthogonal or nearly orthogonal in the time-domain

1608

Configure, for the UE, additional RS sample block allocations based on the UE sharing one or more locations of the at least one RS sample block with at least one second UE

1610

Receive, from the UE, the one or more PUCCH symbols

FIG. 16

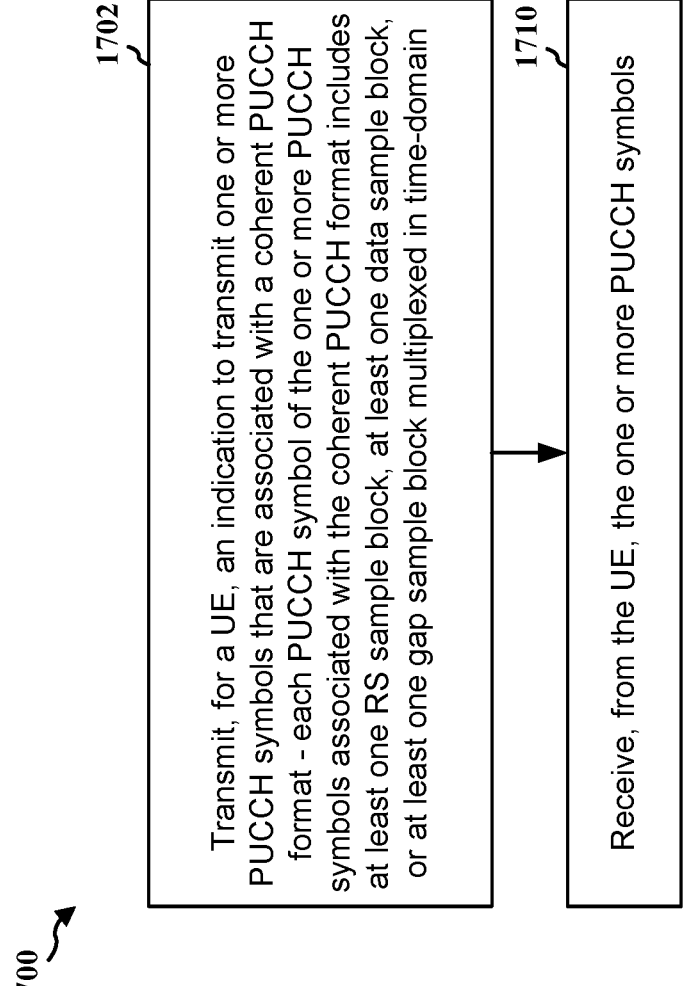

1700

1702

Transmit, for a UE, an indication to transmit one or more PUCCH symbols that are associated with a coherent PUCCH format - each PUCCH symbol of the one or more PUCCH symbols associated with the coherent PUCCH format includes at least one RS sample block, at least one data sample block, or at least one gap sample block multiplexed in time-domain

1710

Receive, from the UE, the one or more PUCCH symbols

FIG. 17

COHERENT PUCCH FORMAT FOR THE TIME-DOMAIN SINGLE-CARRIER WAVEFORM

TECHNICAL FIELD

The present disclosure relates generally to communication systems, and more particularly, to a wireless communication involving physical uplink control channel (PUCCH).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives, from a network entity, an indication to transmit one or more physical uplink control channel (PUCCH) symbols that are associated with a coherent PUCCH format, where each PUCCH symbol of the one or more PUCCH symbols associated with the coherent PUCCH format includes at least one reference signal (RS) sample block, at least one data sample block, or at least one gap sample block multiplexed in time-domain. The apparatus transmits, for the network entity, the one or more PUCCH symbols.

In an aspect of the disclosure, a method, a computer-readable medium, and an apparatus are provided. The apparatus transmits, for a user equipment (UE), an indication to transmit one or more PUCCH symbols that are associated with a coherent PUCCH format, where each PUCCH symbol of the one or more PUCCH symbols associated with the coherent PUCCH format includes at least one RS sample block, at least one data sample block, or at least one gap sample block multiplexed in time-domain. The apparatus receives, from the UE, the one or more PUCCH symbols.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8 is a diagram illustrating an example of inter-PUCCH symbol code-division multiplexing (CDM) in accordance with various aspects of the present disclosure.

FIG. 13 is a flowchart of a method of wireless communication.

FIG. 14 is a flowchart of a method of wireless communication.

FIG. 16 is a flowchart of a method of wireless communication.

FIG. 17 is a flowchart of a method of wireless communication.

DETAILED DESCRIPTION

Figure 1:
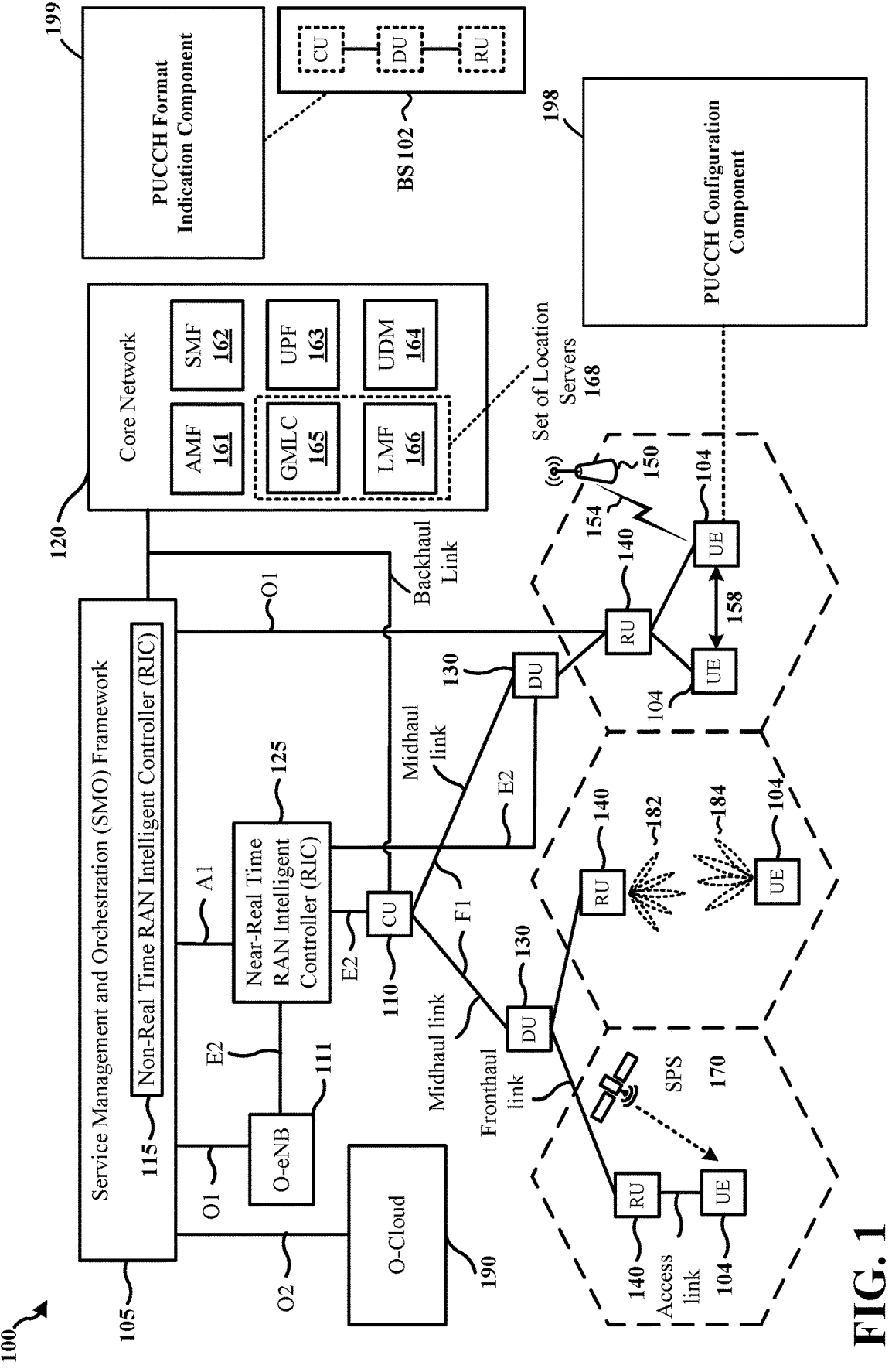
FIG. 1 is a diagram illustrating an example of a wireless communications system and an access network.

Aspects presented herein provide a set of physical uplink control channel (PUCCH) formats that is more suitable for single-carrier (SC)/time-domain waveforms, while maintaining capabilities of PUCCH designed for orthogonal frequency-division multiplexing (OFDM) waveforms (which may be referred to as "OFDM-based PUCCH formats" hereafter). In one aspect, a coherent PUCCH format is designed for the SC waveform, which may be formed by a flexible concatenation of different types of blocks, such as one or more data sample blocks, one or more reference signal (RS) blocks, and/or one or more gap blocks within a PUCCH symbol. The coherent PUCCH format described herein may enable multiple users to be code-division multiplexed (CDMed) across PUCCH symbols (e.g., offering a simpler way to CDM for longer data blocks) as well as within PUCCH symbols (e.g., for most resource efficiency). In addition, demodulation reference signal (DMRS) locations of PUCCH may be shared among multiple users (e.g., with near-orthogonal DMRS sequences) which may result in additional resource saving. The coherent PUCCH format described herein also enables sub-symbol multiplexing of one or more data blocks and RS blocks (e.g., DMRS blocks, phase tracking reference signal (PTRS) blocks, etc.) with gaps in between, which is different from the OFDM-based PUCCH formats that contain either a whole symbol data/DMRS or frequency domain multiplexed data and DMRS, thereby more suitable for SC waveforms.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network.

The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a PUCCH configuration component 198 that may be configured to receive, from a network entity, an indication to transmit one or more PUCCH symbols that are associated with a coherent PUCCH format, where each PUCCH symbol of the one or more PUCCH symbols associated with the coherent PUCCH format includes at least one RS sample block, at least one data sample block, or at least one gap sample block multiplexed in time-domain; and transmit, for the network entity, the one or more PUCCH symbols.

In certain aspects, the base station 102 may have a PUCCH format indication component 199 that may be configured to transmit, for a user equipment (UE), an indication to transmit one or more PUCCH symbols that are associated with a coherent PUCCH format, where each PUCCH symbol of the one or more PUCCH symbols associated with the coherent PUCCH format includes at least one RS sample block, at least one data sample block, or at least one gap sample block multiplexed in time-domain; and receiving, from the UE, the one or more PUCCH symbols.

Figure 2:
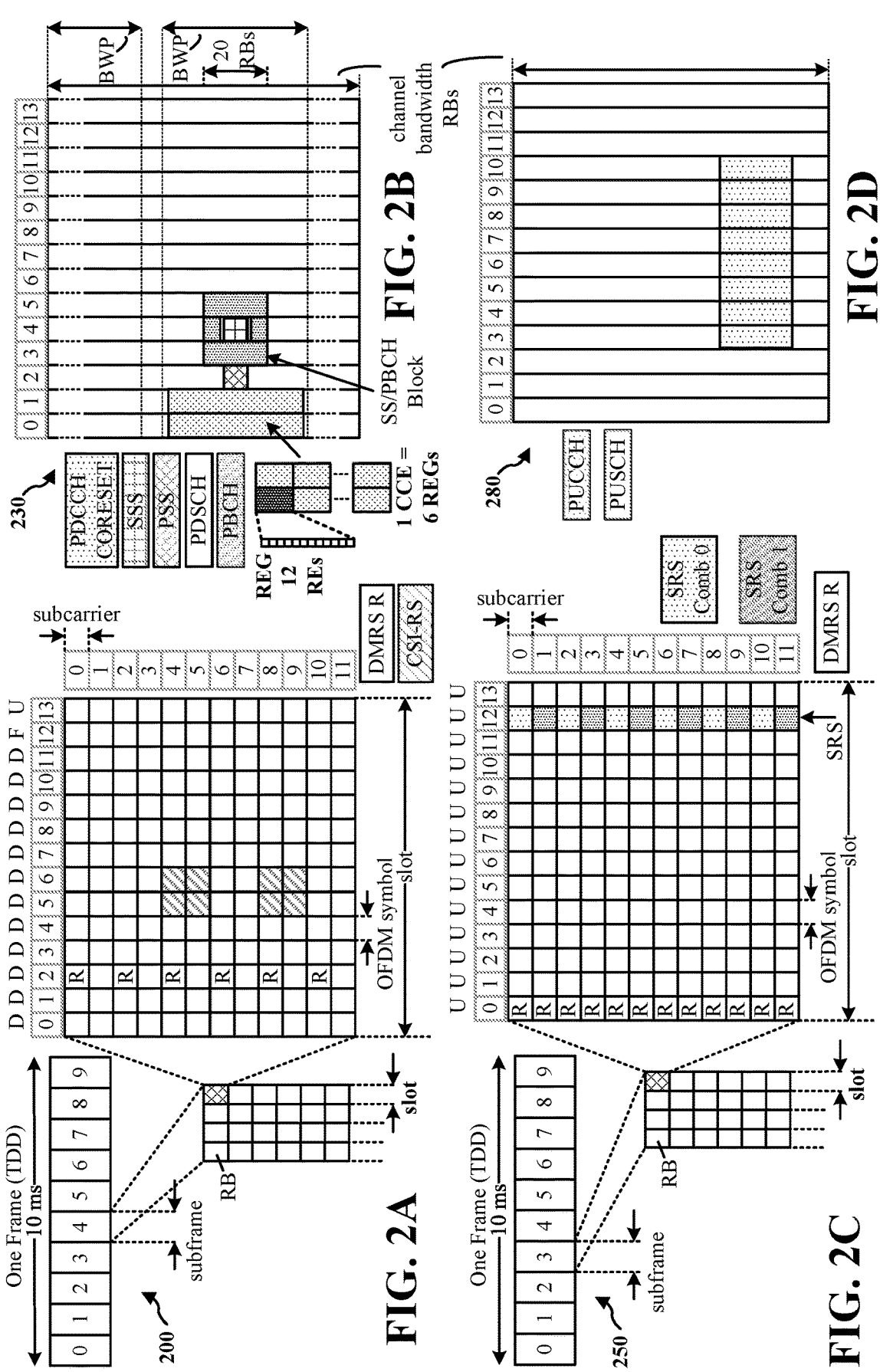
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| | Numerology, SCS, and CP | |
|---|---|---|
| μ | SCS<br>$\Delta f = 2^\mu \cdot 15$ [KHz] | Cyclic prefix |
| 0 | 15 | Normal |
| 1 | 30 | Normal |
| 2 | 60 | Normal,<br>Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
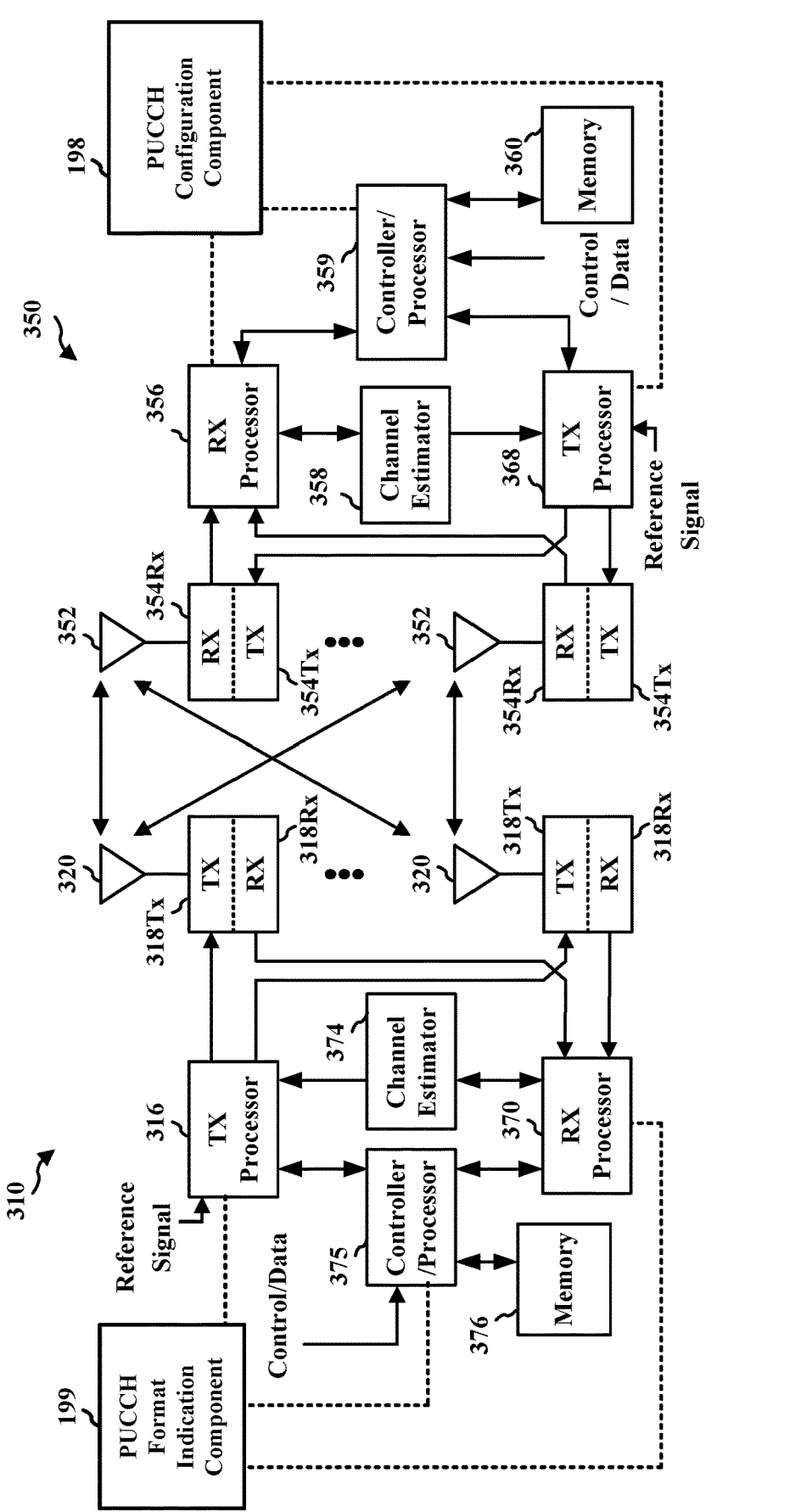
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency-domain, and then combined together using an Inverse Fast Fourier Transform (IFFT) to produce a physical channel carrying a time-domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency-domain using a Fast Fourier Transform (FFT). The frequency-domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the PUCCH configuration component 198 of FIG. 1.

At least one of the TX processor 316, the RX processor 370, and the controller/processor 375 may be configured to perform aspects in connection with the PUCCH format indication component 199 of FIG. 1.

With an increasing demand for faster data transmission, future generations of wireless communication have aimed to provide higher data rates, improved energy efficiency, and lower latency, etc. To achieve this goal, larger antenna arrays and signaling in the high-frequency spectra (e.g., sub-terahertz (THz) bands, frequency bands above 71 GHz, etc.) are expected to be widely used by network providers, where larger antenna arrays may improve spectral efficiency and high-frequency bands may provide more available bandwidth. For example, as wireless communication moves to higher frequency bands, such as sub-THz bands, the antenna dimensions may decrease (e.g., the size of an antenna may be relative to the wavelength it is specified to generate). As such, more antennas or antenna elements may be supported/included in an antenna array for the same antenna array size. With increased number of antennas or antenna elements, a wireless device may be capable of generating higher array gains and narrower beams.

To enable multi-GHz of bandwidth while keeping fast Fourier transform (FFT) with a suitable size (e.g., to limit computation complexity at a UE), sub-carrier spacing (SCS) (e.g., spacing between sub-carriers which may equal to the reciprocal of the symbol time) of a waveform is expected to scale to one (1) MHz or beyond, which likely is going to increase the computational load on a UE. In addition, impact of phase noise likely will be higher at higher SCSs and may specify more resources and better algorithms for mitigation. As orthogonal frequency-division multiplexing (OFDM) waveform(s) generally provide a high peak-to-average power ratio (PAPR), it may limit the coverage (e.g., Tx power constraint) of a UE at high frequency bands. As such, single-carrier (SC) waveforms, such as the SC quadrature amplitude modulation (QAM) waveform, and single-carrier like waveforms, such as DFT-spread-OFDM (DFT-s-OFDM) waveform, may be more suitable for wireless communication at higher frequencies compared to OFDM waveforms. For purposes of the present disclosure, an SC waveform, which may also be referred to as an SC time-domain waveform, may refer to a time-domain waveform that does not use a discrete Fourier transform (DFT) or inverse fast Fourier transform (IFFT) at a transmitter (e.g., transmitter of a UE). For example, an SC waveform may multiplex data directly in the time-domain, which may be beneficial for wireless communication at high frequencies due to lower design complexity and higher resilience to phase noise. The SC waveform may also include SC like waveforms (e.g., waveforms that function like an SC waveform.

For example, a DFT-s-OFDM waveform may be considered as an SC waveform as pre-DFT samples of the DFT-s-OFDM waveform may function as time samples and used for wireless communication (e.g., for NR). In some implementations, a non-DFT based QAM SC waveform may be suitable for communication at higher frequencies as it may provide lower PAPR and lower computational complexity at a UE due to removal of FFT (e.g., no frequency multiplexing), and it may also have lower impact of phase noise. In addition, use of cyclic-prefix (CP), guard-interval (GI), and frequency-domain equalization also gives parity to OFDM waveforms.

The design for single-carrier QAM waveform and/or DFT-s-OFDM waveform may be focused on the time-domain waveform structure instead of the time/frequency grid structure available for the OFDM waveforms. However, limiting the waveform structure to time-domain may specify several modifications to a complicated set of physical uplink control channel (PUCCH) formats that are typically time/frequency grid based. On the other hand, since SC waveforms are based on just the time dimensions (e.g., on time-domain), the splitting between time-domain and frequency-domain may be redundant for SC waveforms. Thus, same/similar capability may be achieved with a simple but extensible PUCCH format design in time-based SC waveform.

In general, a UE may use a PUCCH for sending/transmitting a hybrid automatic repeat request (HARQ) acknowledgement (ACK) or negative acknowledgement (NACK) (HARQ ACK/NACK) feedback, a channel state information (CSI) report, and/or a scheduling request to a network entity (e.g., to a base station). There may be two types of PUCCH formats: a short PUCCH format and a long PUCCH format. The short PUCCH format may include 1-2 symbols and the long PUCCH format may include 4-14 symbols. For example, as shown by the Table 2 below, PUCCH format-0 and format-1 are both limited to one (1) resource block (RB) in frequency-domain. In time-domain, PUCCH format-0 is limited to two (2) symbols while PUCCH format-1 may have up to fourteen (14) symbols. This difference may allow/provide different coverages/repetitions specified for different UEs.

TABLE 2

PUCCH Formats 0/1/2/3/4

| Format | #bits | #symbols | #RBs | Waveform | Benefit | UCI |
|---|---|---|---|---|---|---|
| 0 | <=2 bits | 1-2 | 1 (not config-urable) | Computer generated sequence | Low Latency | HARQ/ Sched Req |
| 1 | <=2 bits | 4-14 | 1 (not config-urable) | Computer generated sequence | Higher Coverage | HARQ/ Sched Req/ CSI-F |
| 2 | >2 bits | 1-2 | 1-16 | OFDM | Low Latency | HARQ/ Sched Req/ CSI-F |
| 3 | >2 bits | 4-14 | 1-6, 8-10, 12, 15, 16 | DFT-S-OFDM | Higher Coverage | HARQ/ Sched Req/ CSI-F |
| 4 | >2 bits | 4-14 | 1 (not config-urable) | DFT-s-OFDM | Higher Coverage | HARQ/ Sched Req/ CSI-F |

Short PUCCH formats may be transmitted in the last one or two symbols for a quick feedback creating a contained data and ACK slot within few tens of μ seconds. The PUCCH may be coded with polar codes and/or Reed-Muller codes, and the PUCCH may be transmitted inside of an active BWP. In some examples, a PUCCH may be explicitly configured to be sent either via a non-supplementary uplink or supplementary uplink (SUL) carrier. If a simultaneous physical uplink shared channel (PUSCH) is scheduled on the same time/frequency resource, uplink control information (UCI) may be multiplexed onto the PUSCH.

Both PUCCH format-3 and PUCCH format-4 may be used for sending a large amount of UCI including CSI report to a network entity (e.g., a base station) and may occupy up to fourteen (14) symbols. However, PUCCH format-4 may be limited to one (1) RB whereas PUCCH format-3 may occupy up to sixteen (16) RBs. This is to enable code division multiplexing (CDM) of more UEs on each physical resource block (PRB). Such design may also not be specified for SC waveforms as the capability to CDM as many users as specified may be flexibly built into a time-domain PUCCH format.

PUCCH formats (or NR PUCCH formats) configured for OFDM waveforms as shown by Table 2 may be categorized into two types: non-coherent and coherent. For non-coherent PUCCH formats (e.g., PUCCH format-0), the PUCCH may be sequence-based and does not include demodulation reference signal (DMRS), which may be more suitable for short transmissions. On the other hand, for coherent PUCCH formats (e.g., PUCCH format-1, 2, 3, and 4, etc.), the PUCCH may be sequence-based or data-based and include DMRS, which may be more suitable for longer transmissions. Both types of PUCCH (e.g., non-coherent and coherent) may have the ability to frequency hop between symbols (e.g., to achieve diversity), and hop between base-sequences and possible cyclic-shift to randomize cross-cell interference. Both types of PUCCH may also code-division multiplex users by using an orthogonal cover code.

Aspects presented herein provide a set of PUCCH formats that is more suitable for SC/SC-like time-domain waveforms, while maintaining capabilities of PUCCH designed for NR/OFDM waveforms (which may be referred to as "OFDM-based PUCCH formats" hereafter). In other words, aspects presented herein provide a set of PUCCH formats for SC waveforms that includes capabilities of NR PUCCH. The set of PUCCH formats for SC waveforms (e.g., the SC QAM waveform, the DFT-s-OFDM waveform, etc.) may include a coherent format and a non-coherent format, where each of these formats may include a building block that is capable of being extended as per resource specification and provides various capabilities presented in the OFDM-based PUCCH formats. In one aspect, a coherent PUCCH format is designed for the SC waveform, which may be formed by a flexible concatenation of different types of blocks, such as one or more data sample blocks, one or more reference signal (RS) blocks, and/or one or more gap blocks within a PUCCH symbol. The coherent PUCCH format described herein may enable multiple users to be code-division multiplexed (CDMed) across PUCCH symbols (e.g., offering a simpler way to CDM for longer data blocks) as well as within PUCCH symbols (e.g., for most resource efficiency). In addition, DMRS locations of PUCCH may be shared among multiple users (e.g., with near-orthogonal DMRS sequences) which may result in additional resource saving. The coherent PUCCH format described herein also enables sub-symbol multiplexing of one or more data blocks and RS blocks (e.g., DMRS blocks, phase tracking reference signal (PTRS) blocks, etc.) with gaps in between, which is different from the OFDM-based PUCCH formats that contain either a whole symbol data or DMRS.

Figure 4:
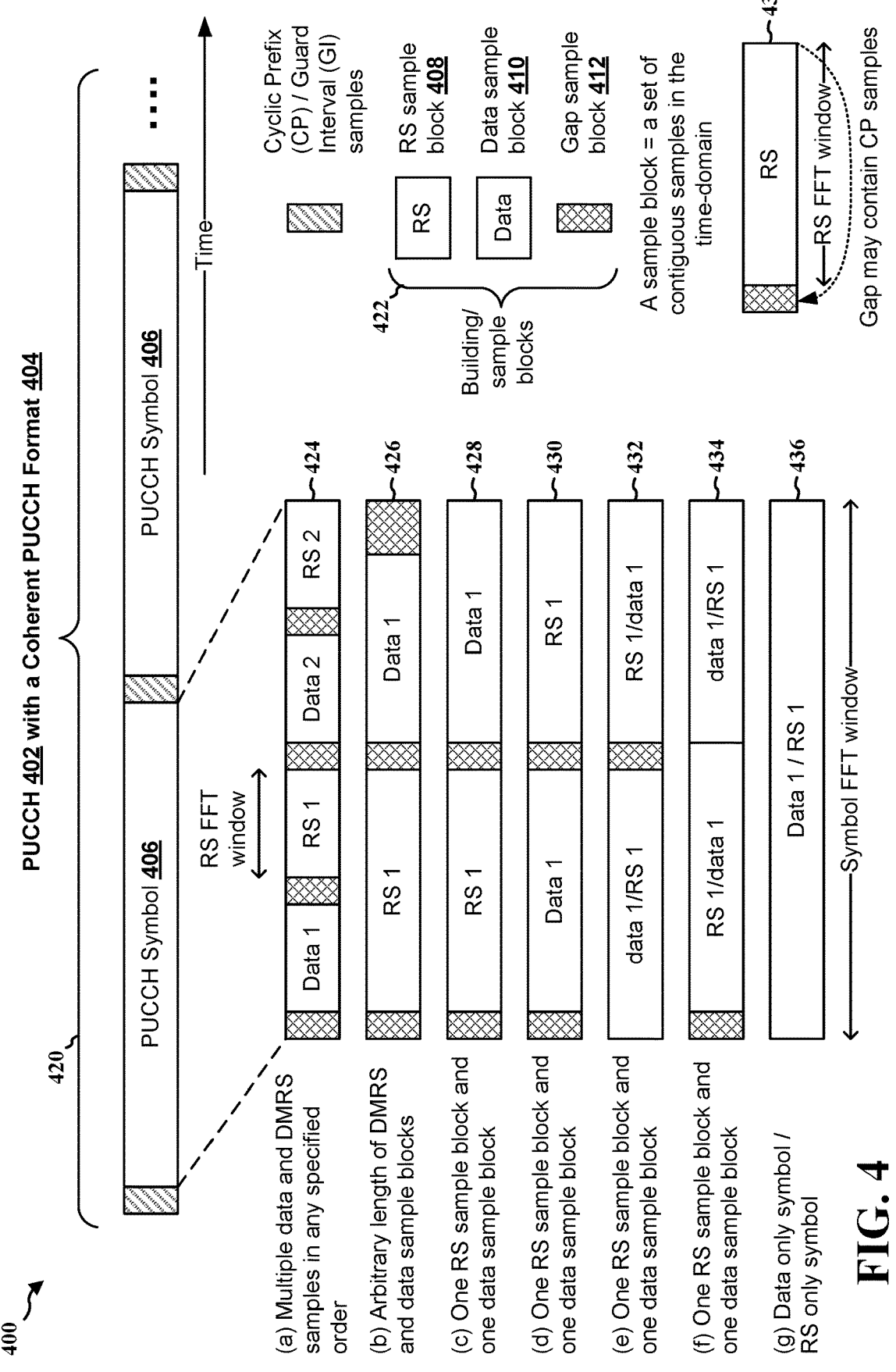
FIG. 4 is a diagram illustrating an example physical uplink control channel (PUCCH) symbol with a coherent PUCCH format for single-carrier (SC) waveforms in accordance with various aspects of the present disclosure.

FIG. 4 is a diagram 400 illustrating an example PUCCH symbol with a coherent PUCCH format for SC waveforms in accordance with various aspects of the present disclosure. For purposes of the present disclosure a coherent PUCCH format may refer to a PUCCH format which provides for a DMRS or demodulation reference signal associated with the control data/information. The DMRS may be used for channel estimation and thus the data can be demodulated coherently by utilizing the channel estimate. A non-coherent PUCCH format, on the other hand, does not include DMRS. The control information may be encoded into some manipulation of a known sequence such as its cyclic shifts or root. These manipulations may be detected at the receiver to decode the control bits. In some examples, a coherent PUCCH format may also mean that a DMRS is provided for or associated with each data sample, and the DMRS may be within the same PUCCH or shared with another PUCCH in our design. In another example, a coherent PUCCH format may refer to a PUCCH format that is sequence-based or data-based, and is associated with at least one RS, such as DMRS. For example, each data sample block in a PUCCH symbol with the coherent PUCCH format may have at least one corresponding RS sample block with common spatial parameters like beam and/or precoders that may be used for channel estimation. This corresponding RS sample block may be within the same PUCCH symbol, same set of PUCCH symbols, or different set of PUCCH symbols (e.g., in case of shared DMRS), etc.

In one aspect of the present disclosure, as shown at 420, a PUCCH 402 with a coherent PUCCH format 404 (e.g., for SC waveform(s)) may include one or more PUCCH symbols 406. For purposes of the present disclosure, a symbol or a PUCCH symbol may be defined as a time-domain entity (e.g., a unit of time) that has its own cyclic prefix (CP) and/or guard interval (GI).

In one example, as shown at 422, each PUCCH symbol 406 may be configured to include one or more RS sample blocks 408 (e.g., include one or more reference signals such as DMRS, PTRS, etc.), one or more data (e.g., modulated) sample blocks 410 (e.g., samples from a Zadoff-Chu sequence, QAM modulated samples, etc.), and/or one or more gap sample blocks 412 (e.g., sample blocks with zeros or known values to prevent inter-symbol interference (ISI) between sample blocks). For purposes of the present disclosure, a sample block may refer to a set of contiguous samples in the time-domain. For example, an RS sample block 408 may refer to a set of contiguous RS samples in the time-domain, a data sample block 410 may refer to a set of contiguous data samples in the time-domain, and a gap sample block 412 may refer to a set of contiguous gap samples in the time-domain, etc. In some examples, a sample block may also be referred to as a "symbol part." In addition, a sample may refer to a smallest (e.g., in size) individual entity produced by a digital circuitry. In some examples, a sample may be a value of a signal at a single point in time or space.

For example, as shown at 424, a PUCCH symbol 406 that is associated with the coherent PUCCH format 404 may include multiple data sample blocks and RS sample blocks, such two data sample blocks and two RS sample blocks. In addition, the sample blocks may be arranged to different orders in the time-domain, such as (first data sample block-→first RS sample block→second data sample block→second RS sample block) or (first data sample block→second data sample block→first RS sample block→second RS sample block), etc. The order of the sample blocks may be configured via a network entity (e.g., via network signaling). In addition, a gap sample block 412 may be inserted/allocated between two sample blocks, in front of a sample block, and/or after a sample block to prevent ISI between sample blocks/symbols. For example, as shown at 424, a gap sample block 412 may be inserted between an RS sample block 408 and a data sample block 410, or in front of the first sample block (e.g., the first data sample block). A gap sample block 412 may include zero value samples (e.g., the gap samples are expected to be zeros) or some known value samples. In some examples, a GI sequence may be inserted in a gap sample block 412.

Similarly, as shown at 426, a PUCCH symbol 406 that is associated with the coherent PUCCH format 404 may include one RS sample block 408 and one data sample block 410, and at least one gap sample block 412 may be inserted between the RS sample block 408 and the data sample block 410 to avoid ISI while decoding. Additional gap sample blocks 412 may also be placed at the beginning and/or at the end of the PUCCH symbol 406 depending on the implementation.

As shown at 428, 430, and 432, the PUCCH symbol 406 may also include one RS sample block 408 and one data sample block 410 that are separated by a gap sample block with different arrangements. For example, as shown at 428, one RS sample block 408 may be followed by one data sample block 410 with one gap sample block 412 before the RS sample block 408 and one gap sample block 412 before the data sample block 410. The arrangement shown at 430 is similarly to the arrangement shown at 428 but with the one data sample block 410 followed by one RS sample block

408. Arrangement shown at 432 is also similarly to the arrangement shown at 428 but without one gap sample block 412 before the RS sample block 408. For example, one data sample block 410 may be followed by one gap sample block 412 and one RS sample block 408. Such configuration may enable the CP before the data sample block 410 to be known as it may be taken from the RS sample block 408. For example, as shown at 438, a gap sample block 412 before an RS sample block 408 may contain CP samples copied from the end of the RS sample block 408 (e.g., to enable the RS sample block 408 detection). In another example, one RS sample block 408 may be followed by one gap sample block 412 and one data sample block 410. In this configuration, the CP before the PUCCH symbol 406 may come from the RS sample block 408. The one gap configuration described in connection with 432 may be possible or preferred when the gap samples and the CP samples and/or the RS detection FFT window and the data detection FFT window are chosen appropriately, which enables a receiver to successfully decode both the data and the RS.

Figure 20:
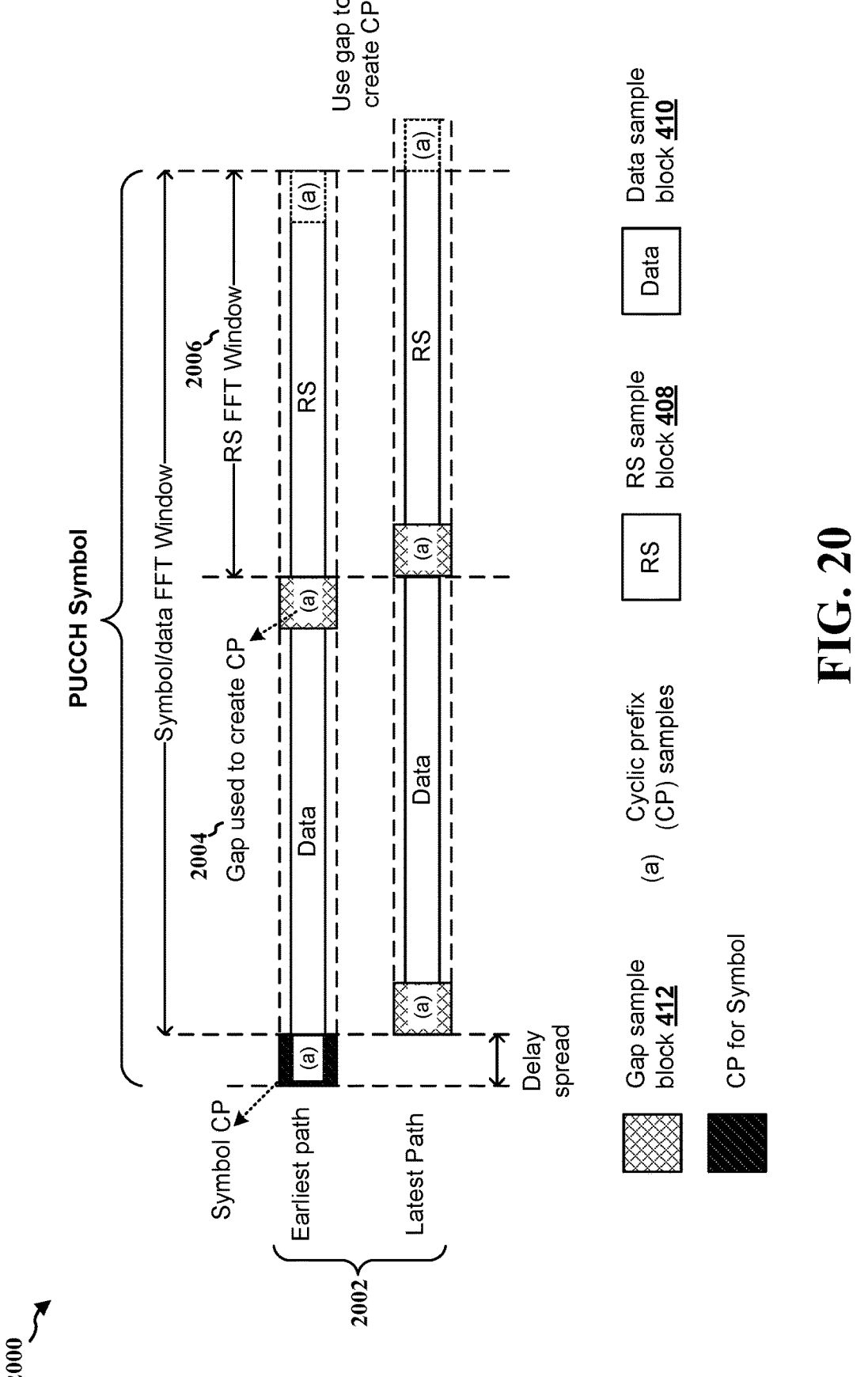
FIG. 20 is a diagram illustrating an example of a PUCCH symbol configuration with one data sample block followed by one gap sample block followed by one RS sample block in accordance with various aspects of the present disclosure.

FIG. 20 is a diagram 2000 illustrating an example of a PUCCH symbol configuration with one data sample block 410 followed by one gap sample block 412 and then followed by one RS sample block 408 in accordance with various aspects of the present disclosure. As shown at 2002, multiple PUCCH symbol copies may be received by a receiver due to channel multipath including a first path (e.g., an earliest path) and a second path (e.g., a latest path) (additional details are discussed in connection with FIG. 5). As shown at 2004, the gap sample block 412 may be used to create a cyclic prefix structure for the RS sample block 408 so that RS sample block 408 can be detected using a RS FFT window (e.g., as shown at 2006). The detected RS samples (e.g., in the RS sample block 408) may be used by the receiver to estimate the wireless channel and aid in channel equalization. The data samples (e.g., in the data sample block 410)) may then be detected using a symbol/data FFT window. In some examples, overlap of unknown samples with known samples may cause problems in channel estimation hence to be avoided. With sub-symbol multiplexing of data sample blocks and RS sample blocks, channel estimation may be done either in frequency-domain using a separate smaller RS FFT window or in time-domain (which may not specify an extra FFT window apart from symbol FFT window).

In another example, as shown at 434, a PUCCH symbol 406 that is associated with the coherent PUCCH format 404 may include one RS sample block 408 and one data sample block 410 without a gap sample block 412 in between. For example, the PUCCH symbol 406 may include one gap sample block 412 followed by one RS sample block 408 and one data sample block 410 (or followed by one data sample block 410 and one RS sample block 408). Similarly, as shown at 438, the gap sample block 412 before the RS sample block 408 may contain CP samples copied from the end of the RS sample block 408 (e.g., to enable the RS sample block 408 detection).

Figure 19:
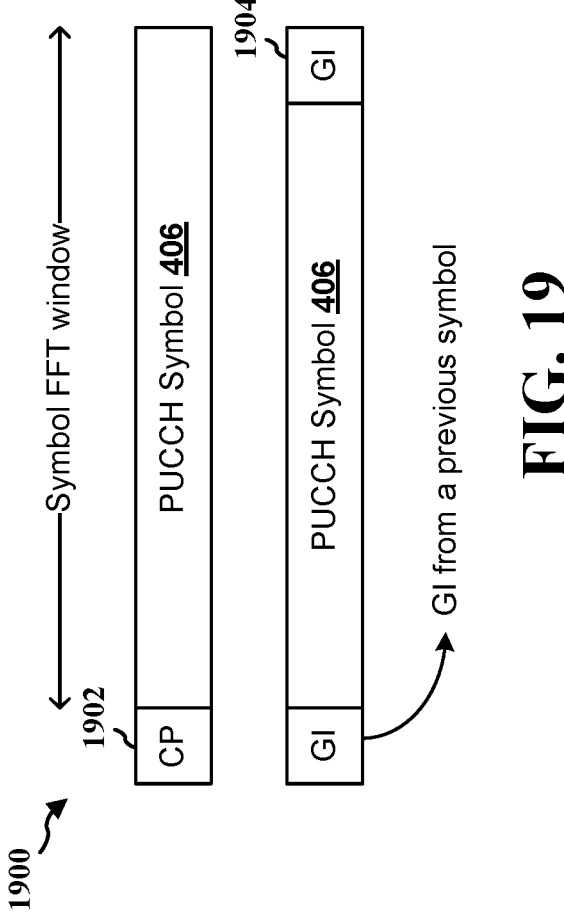
FIG. 19 is a diagram illustrating an example of placing a cyclic prefix (CP) or a guard interval (GI) for a PUCCH symbols in accordance with various aspects of the present disclosure.

In other examples, as shown at 436, a PUCCH symbol 406 that is associated with the coherent PUCCH format 404 may be occupied by an RS sample block 408 without data sample block(s) 410 and/or gap sample block(s) 412, or occupied by a data sample block 410 without RS sample block(s) 408 and/or gap sample block(s) 412, etc. In other words, an RS sample block 408 or a data sample block 410 may occupy an entire PUCCH symbol 406. In another example, as shown by a diagram 1900 of FIG. 19, in each case, either a CP or a GI may be additionally added to these PUCCH symbols 406. For example, as shown at 1902, a CP may be placed outside the symbol FFT window, and as shown at 1904, a GI may be placed within the symbol FFT window (e.g., a GI may be a guard interval that is inside the symbol FFT window, and the GI may contain a known sequence). Both CP and GI may help create circular convolution property with regard to the symbol FFT window.

In another aspect of the present disclosure, a sample block may include a flexible and network configurable number of samples based on UE/network specification. For example, as shown at 428 and 430 of FIG. 4, a data sample block 410 or an RS sample block 408 may span a complete/whole PUCCH symbol 406 if more uplink (UL) control data is specified to be sent by a UE. In some examples, or as an alternative, data sample block(s) and RS sample block(s) may be multiplexed inside a same PUCCH symbol 406, such as shown at 424 and 426 of FIG. 4. These sample blocks may be in any specified order (e.g., configured by a network entity such as a base station). In addition, the length of the sample blocks may also be configurable, such as by a network entity. For example, a base station may increase or decrease the length of a data sample block or an RS sample block for a UE based on specification/situation (e.g., when the UE is configured to send a longer/shorter RS or data).

Note that for a coherent PUCCH format, a data sample block may be specified to be associated with (e.g., connected to) at least one RS sample block (e.g., using same beams, and/or precoders, etc.), such that the at least one RS sample block may be used for the channel estimation. Thus, if a PUCCH symbol 406 includes just data sample block(s) (e.g., as shown at 430), the data sample block(s) may use RS sample block(s) on other PUCCH symbol(s), such as an RS sample block in a previous PUCCH symbol or a subsequent PUCCH symbol. For example, a receiver may estimate the channel using the RS in a previous symbol and then apply it to decode the data on the next symbol.

In some examples, the length of a gap sample block 412 may depend on the delay spread. A delay spread may indicate how much a signal get dispersed in the time-domain (in terms of reception timing at reception (Rx) antenna of a receiver).

Figure 5:
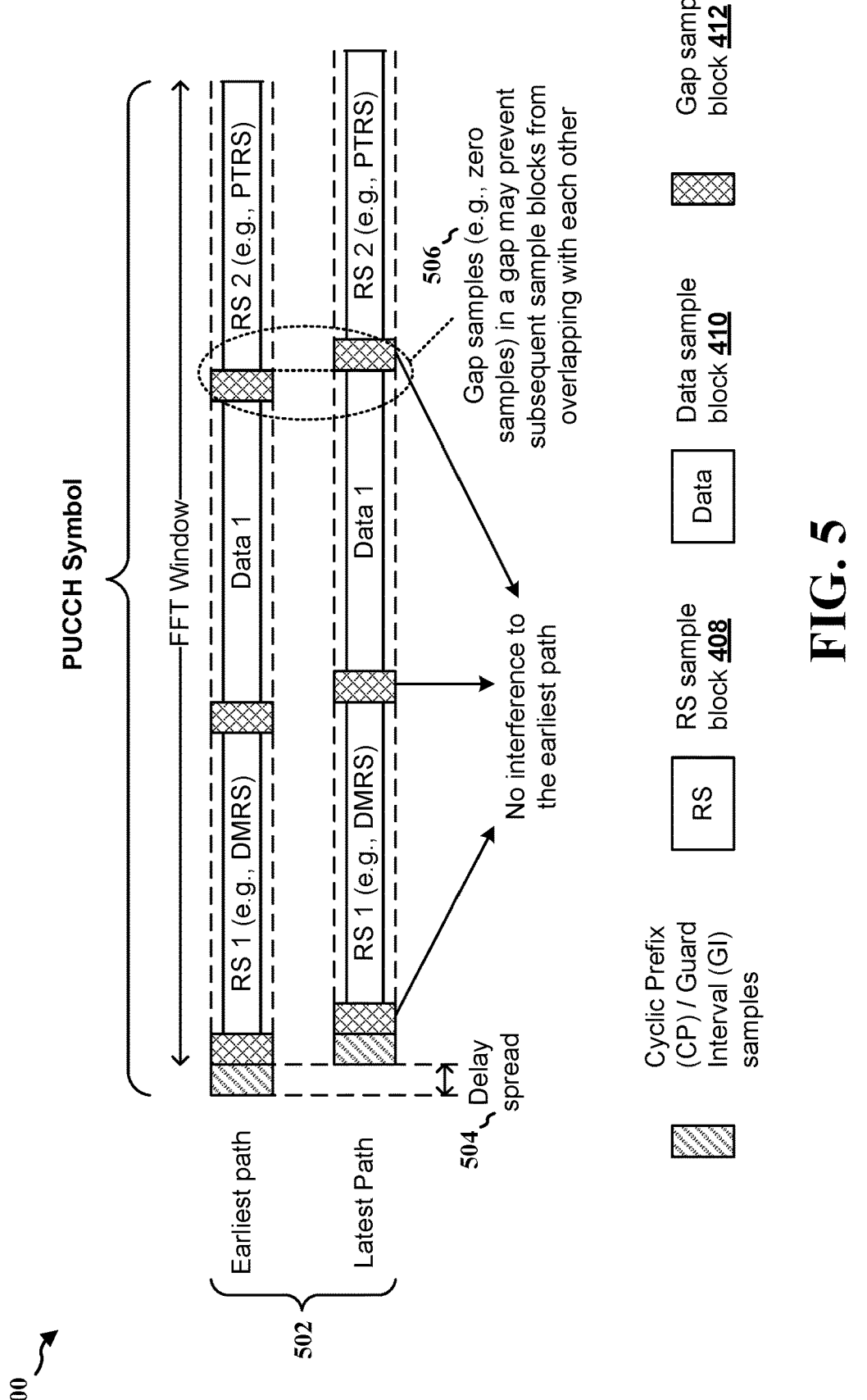
FIG. 5 is a diagram illustrating an example of configuring the length of a gap sample block based on a delay spread in accordance with various aspects of present disclosure.

FIG. 5 is a diagram 500 illustrating an example of configuring the length of a gap sample block based on a delay spread in accordance with various aspects of present disclosure. As shown at 502, a receiver (e.g., a network entity) may receive a PUCCH symbol (e.g., the PUCCH symbol 406 that is associated with the coherent PUCCH format 404) from a UE via multiple paths, where the earliest path and the latest path may have a delay spread of X microseconds (μs), such as shown at 504. Without gap sample blocks, sample blocks (and also the CP/GI) in the PUCCH symbol of the latest path may overlap with sample blocks in the PUCCH symbol of the earliest path, which may cause interference at the receiver when receiving the PUCCH symbol. For example, without gap sample blocks, the data sample block in the PUCCH symbol of the latest path may overlap with the RS sample block(s) in the PUCCH symbol of the earliest path. By having the gap sample block(s), the RS sample block(s) and the data sample block(s) may be detected without mutual interference. Note that overlapping of the same sample block may be resolved by the corresponding CP. For example, if a data sample block of one path is overlapped with the data sample block of another path, the data sample block may be considered to be overlapped with a cyclic version of the data sample block, which may be handled/resolved with a one tap equalizer.

On the other hand, as shown at 506, when gap sample blocks are inserted between sample blocks and the gap sample blocks have similar or the same length as the delay spread, sample blocks in the PUCCH from the latest path may avoid interfering the sample blocks in the PUCCH of the earliest path as the gap sample blocks may prevent subsequent sample blocks from overlapping with each other.

There may be various advantages to configure multiple sample blocks within a single PUCCH symbol with gap sample blocks between them as discussed in connection with FIGS. 4 and 5. For example, one symbol of PUCCH (e.g., the PUCCH symbol 406) may be capable of carrying a short sample block of data and a short sample block of RS as opposed to using two different PUCCH symbols (e.g., one PUCCH symbol for RS and one PUCCH symbol for data). Such configuration may be suitable for short uplink signaling by using minimum resources.

Figures 6A, 6B:
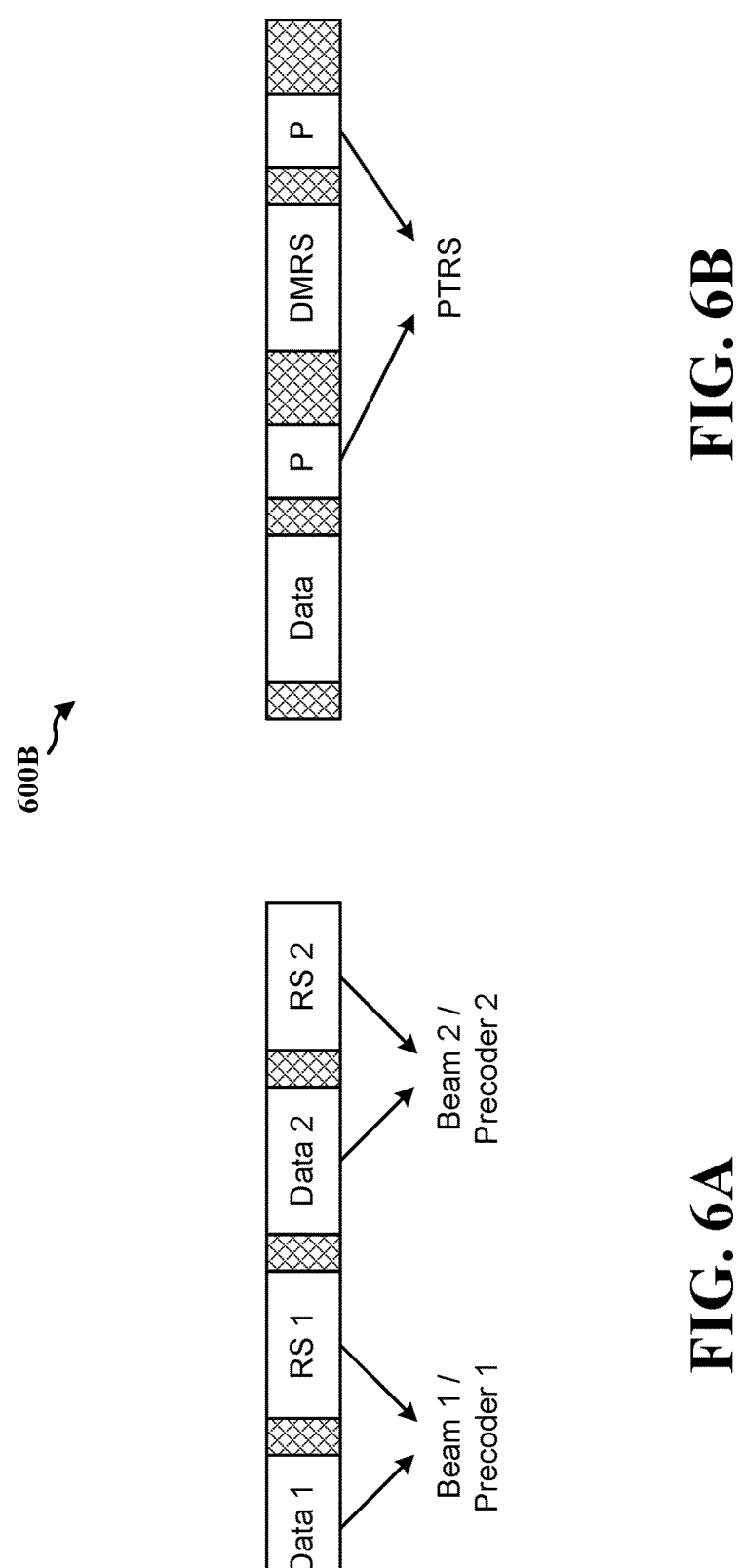
FIG. 6A is a diagram illustrating an example of different sample blocks within a PUCCH symbol using different beams or precoders in accordance with various aspects of present disclosure.
FIG. 6B is a diagram illustrating an example of multiplexing different kinds/types of reference signal (RS) within a same PUCCH symbol in accordance with various aspects of present disclosure.

In another example, as shown by a diagram 600A of FIG. 6A, multiple sample blocks that use different beams or precoders may be transmitted within a PUCCH symbol. For example, a first data sample block that is associated with a first RS sample block (e.g., DMRS 1) using a first beam and/or a first precoder (e.g., beam 1/precoder 1) may be transmitted in a same PUCCH symbol with a second data sample block that is associated with a second RS sample block (e.g., DMRS 2) using a second beam and/or a second precoder (e.g., beam 2/precoder 2). This may enable beam and/or precoder hopping for different sample blocks. This may also provide better diversity as the same data may be transmitted via multiple beams in a PUCCH symbol. In another example, as shown by a diagram 600B of FIG. 6B, different kinds/types of RS may be multiplexed within a same PUCCH symbol. For example, a PUCCH symbol may include both DMRS and PTRS that are separated with gap sample blocks. In some examples, the RS sample blocks may also be distributed in a way for a better/improved channel estimation. For example, one or more PTRS sample blocks may be distributed inside the PUCCH symbol to enable capturing of phase noise variation and/or better common phase error (CPE) compensation.

In another example, by enabling a PUCCH symbol to include multiple types of sample blocks as described in connection with FIGS. 4 and 5, data and DMRS that use the same beam and/or precoder may be combined for detection. For example, multiple/all data blocks may be combined into one large block and multiple/all DMRS blocks may also be combined into one large block, leading to two blocks. Thus, the PUCCH symbol may appear to be no different from just having two blocks separated by a gap. Thus, same DMRS/data may be combined to save some gap overhead. If a data sample block or an RS sample block is long enough to span a PUCCH symbol, then each PUCCH symbol may contain just one sample block.

Figure 7:
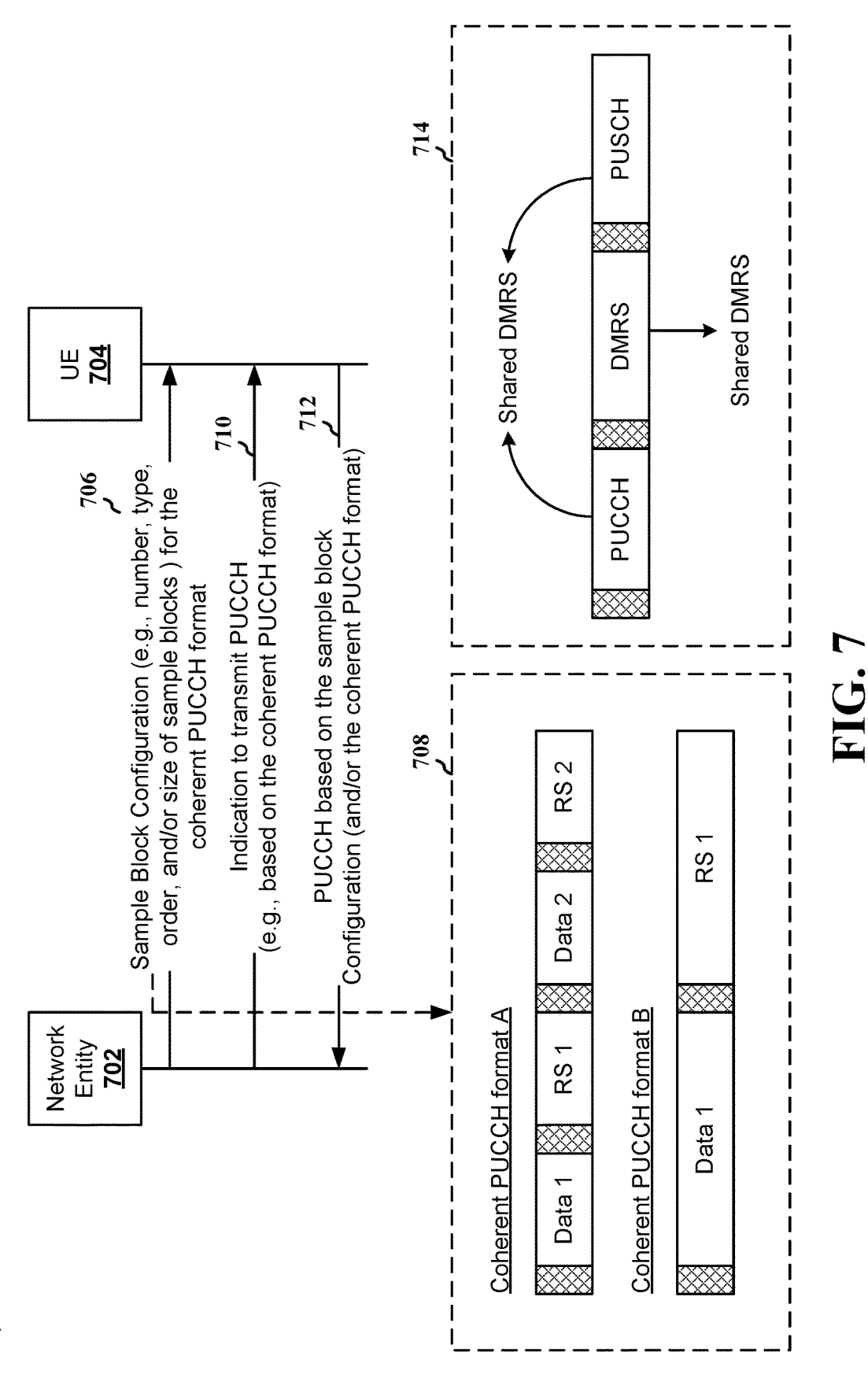
FIG. 7 is a diagram illustrating an example of a network entity configuring the sample blocks in a PUCCH symbol for a UE in accordance with various aspects of the present disclosure.

FIG. 7 is a diagram 700 illustrating an example of a network entity configuring the sample blocks in a PUCCH symbol for a UE in accordance with various aspects of the present disclosure. In another aspect of the present disclosure, the number, the type (e.g., RS, data, gap, etc.), order, and/or size (e.g., the length or number of samples) of the sample blocks in one or more PUCCH symbols may be configured by a network entity, such as a base station. For example, as shown at 706 of FIG. 7, a network entity 702 (e.g., a base station) may configure sample blocks for a UE 704, where the configuration may include number of sample blocks to be included (e.g., in a PUCCH symbol), the type of sample blocks to be included, the order for the sample blocks, and/or the size for each sample block, etc. In some examples, the configuration may be explicitly indicated to the UE 704, such as through indication in bits while allocating PUCCH resource for the UE. In other examples, the configuration may be implicitly indicated to the UE 704, such as indicating the UE 704 to use one of specified PUCCH formats (e.g., a coherent PUCCH format A, a coherent PUCCH format B, etc.), where each specified PUCCH format may include a fixed set of parameters. For example, as shown at 708, the coherent PUCCH format A may include two data sample blocks and two RS sample blocks in a PUCCH symbol, whereas the coherent PUCCH format B may include one data sample block and one RS sample block in a PUCCH symbol, etc.

At 710, the network entity 702 may transmit an indication to the UE 704 to transmit one or more PUCCH symbols based on the sample block configuration (e.g., based on a specified coherent PUCCH format). In some implementations, the indication may also include allocation of resources for PUCCH transmission. For example, the indication may be explicit in a message (e.g., via DCI, MAC-CE, and/or RRC) or tied to successful or unsuccessful reception of another downlink (DL) transmission (e.g., a PDSCH) in order to send some feedback about that transmission (e.g., ACK/NACK). In another example, the indication may be periodic (e.g., via a configured grant), semi-persistent, or aperiodic. As described in connection FIG. 4, a coherent PUCCH format may refer to a PUCCH symbol that includes at least one RS sample block, at least one data sample block, or at least one gap sample block multiplexed in time-domain, etc. In response, as shown at 712, the UE 704 may transmit one or more PUCCH symbols based on the sample block configuration and/or the indicated coherent PUCCH format. In some examples, as shown at 714, DMRS of a PUCCH may be shared with another uplink (UL) signal like PUSCH. Also, a PUSCH may be multiplexed in the same symbol as a PUCCH (and share the same DMRS).

In another aspect of the present disclosure, by enabling multiple types of sample blocks to be configured within a single PUCCH symbol as discussed in connection with FIGS. 4 and 5, multiple users/UEs may be code division multiplexed (CDMed) in a same PUCCH time resource by using a cover code that is unique to each UE, where the cover code may be assigned to each UE by a network entity/base station based on the corresponding UE ID and cell ID. In some scenarios, CDM may provide a gain to the uplink signal power and enable UEs to be multiplexed on the same time resource. In one aspect, two levels of CDM may be configured for a set of UEs: a symbol level CDM and a sub-symbol CDM.

Under the symbol level CDM, a network entity may be configured to enable just the symbol level CDM for its users/UEs. For example, users/UEs may apply their corresponding cover codes on each PUCCH symbol and generate coded copies of each PUCCH symbol. However, coded repetitions inside a PUCCH symbol may not be allowed. Such configuration/setting may provide a lot of flexibility to the network entity for CDM users at symbol level. However, such configuration may also lose some efficiency as some PUCCH symbols may have empty gaps that may be filled with CDMed samples. The symbol level CDM configuration may be beneficial for users/UEs with PUCCH payloads of one symbol or larger.

On the other hand, under the sub-symbol level CDM, a network entity may be configured to enable CDM at a granularity finer than one PUCCH symbol (e.g., at a fixed number of samples). One benefit of such configuration is better resource utilization as more data may be packed into a PUCCH symbol. However, users/UEs that have longer data/RS blocks than the CDM length may be specified to split the sample block and code them separately, which may increase the coding complexity at the users/UEs. As such, the sub-symbol level CDM configuration may be beneficial for users/UEs with payloads less than 1 symbol.

Figure 8:
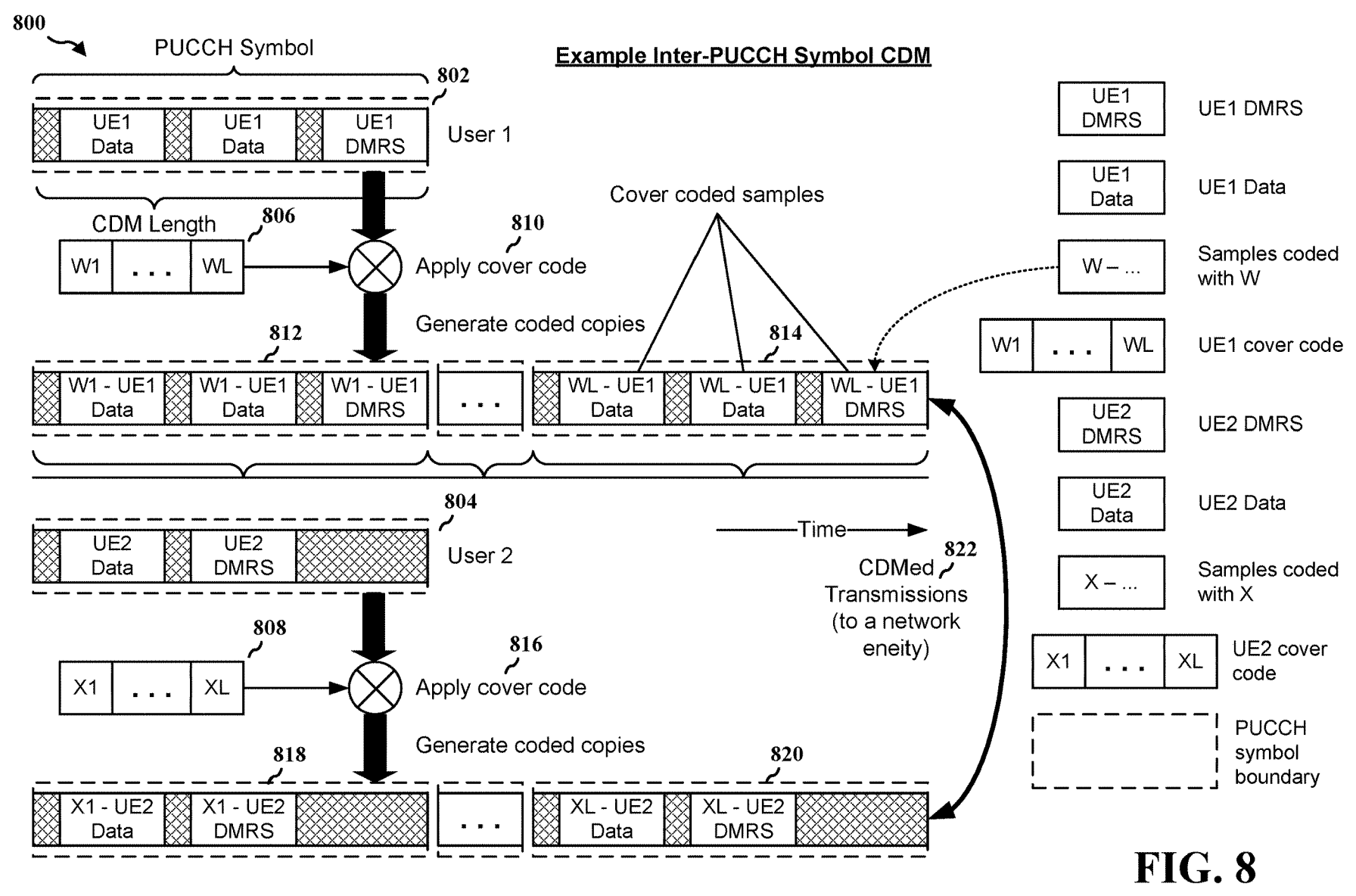

FIG. 8 is a diagram 800 illustrating an example of inter-PUCCH symbol CDM (e.g., the symbol level CDM configuration) in accordance with various aspects of the present disclosure. As shown at 802, a first user (user 1) or a first UE may have a PUCCH symbol to be transmitted to a network entity, where the PUCCH symbol includes two data sample blocks and one RS sample block (e.g., DMRS sample block). Similarly, as shown at 804, a second user (user 2) or a second UE may also have a PUCCH symbol to be transmitted to the network entity, where the PUCCH symbol includes one data sample block and one RS sample block (e.g., DMRS sample block).

If both the first user and the second user transmit their corresponding PUCCH symbols at the same time (without multiplexing), there may be a lot of interference at the network entity when the network entity receives the PUCCH symbols. As such, the network entity may enable the PUCCH symbol from the first user and the PUCCH symbol from the second user to be CDMed by assigning each user with a corresponding cover code. For example, the network entity may assign the first user with a first cover code (e.g., W1 . . . WL), such as shown at 806, where the first cover code may be determined based on the UE ID and Cell ID associated with the first user. Similarly, the network entity may also assign the second user with a second cover code (e.g., X1 . . . XL), such as shown at 808, where the second cover code may be determined based on the UE ID and Cell ID associated with the second user. L may indicate the total number of users to be CDMed. In this example, if there are two users, then L=2. Then, the first cover code may correspond to (W1, W2), and the second cover code may correspond to (X1, X2).

After the first user obtains its cover code, as shown at 810, the first user may apply its cover code to its PUCCH symbol. Then, the first user may generate multiple coded copies of the PUCCH symbol based on the cover code. For example, as shown at 812, the first user may generate a first coded copy of the PUCCH based on the cover code W1, and as shown at 814, the first user may generate a second coded copy of the PUCCH based on the cover code W2. In other words, the cover code may enable each user to generate L coded copies of the PUCCH symbol (e.g., L being the number of users to be CDMed). Similarly, after the second user obtains its cover code, as shown at 816, the second user may apply its cover code to its PUCCH symbol. Then, the second user may generate multiple coded copies of the PUCCH symbol based on the cover code similar to the first user. For example, as shown at 818, the second user may generate a first coded copy of the PUCCH based on the cover code X1, and as shown at 820, the second user may generate a second coded copy of the PUCCH based on the cover code X2. Then, after all users (e.g., the first user and the second user) generated their corresponding coded copies of the PUCCH symbol using their cover codes, as shown at 822, the users may transmit their coded copies of the PUCCH symbol to the network entity based on CDM (which may be referred to as CDM transmissions).

The network entity may receive the coded copies of the PUCCH symbol from all users as a combined data based on the CDM transmission. To recover/detect the corresponding PUCCH symbol of each user, the network entity may apply the cover code to the combined data received in a reversed manner. For example, if the network entity is to recover/detect the PUCCH symbol transmitted by the first user, the network entity may multiply the first part of the combined data with W1 and the second part of the combined data with W2, and coherently add them together to obtain the PUCCH symbol transmitted from the first user. Similarly, if the network entity is to recover/detect the PUCCH symbol transmitted by the second user, the network entity may multiply the first part of the combined data with X1 and the second part of the combined data with X2, and coherently add them together to obtain the PUCCH symbol transmitted from the second user. In some examples, these cover codes may be orthogonal or nearly orthogonal, which may enable more users to be CDMed on a set of time resources or enable more (different) ports of a UE to be CDMed on a set of time resources, etc.

Figure 9:
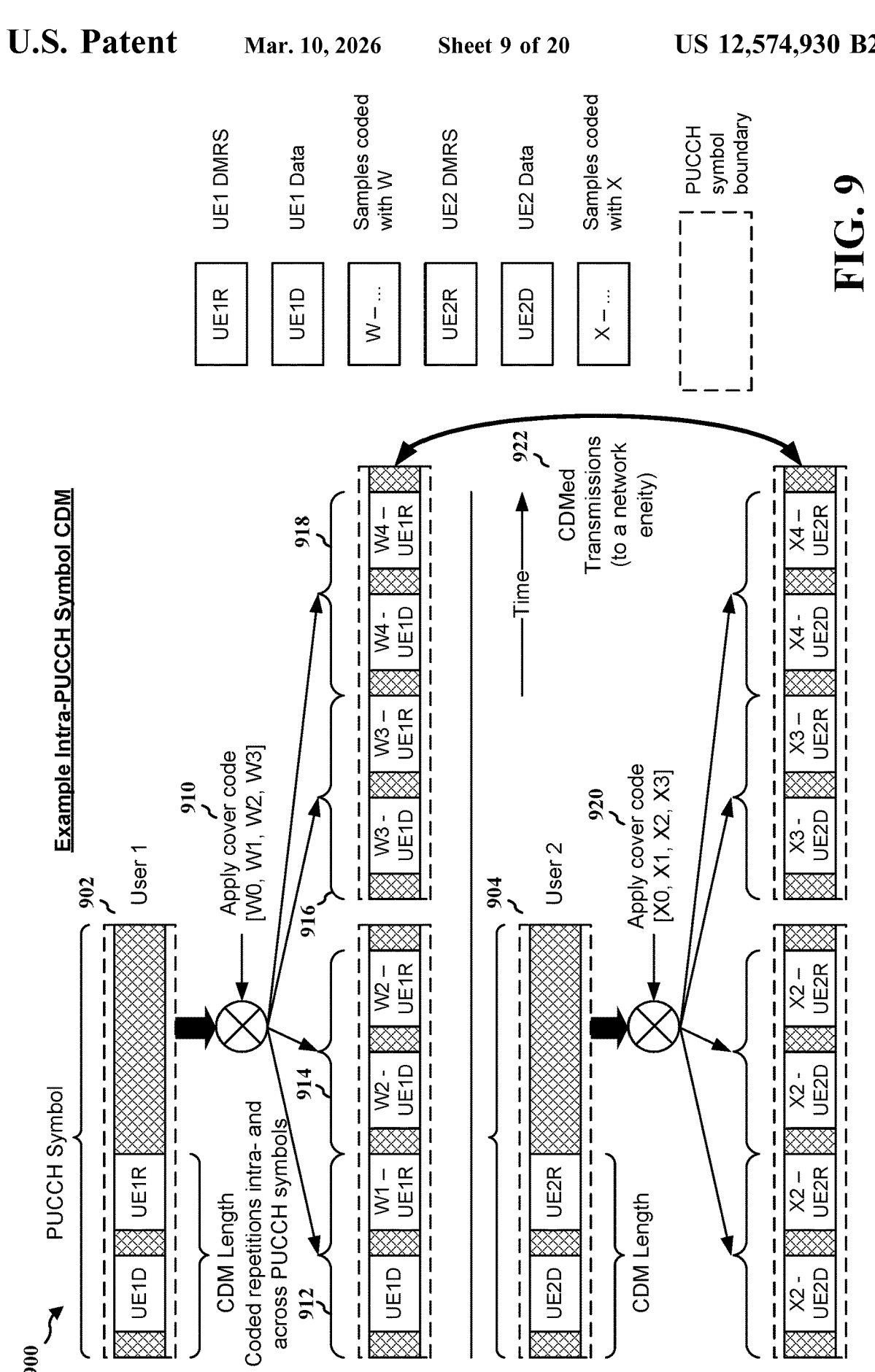
FIG. 9 is a diagram illustrating an example of intra-PUCCH symbol CDM in accordance with various aspects of the present disclosure.

FIG. 9 is a diagram 900 illustrating an example of intra-PUCCH symbol CDM (e.g., the sub-symbol level CDM configuration) in accordance with various aspects of the present disclosure. As shown at 902, a first user (user 1) or a first UE may have a PUCCH less than a symbol (which may be referred to as a "small PUCCH" hereafter for purposes of illustration) to be transmitted to a network entity, where the PUCCH symbol includes one small data sample block and one small RS sample block. Similarly, as shown at 904, a second user (user 2) or a second UE may also have a small PUCCH less than a symbol to be transmitted to the network entity, where the PUCCH symbol may also include one small data sample block and one small RS sample block.

If both the first user and the second user transmit their small PUCCHs using the full PUCCH symbol, it may not be resource efficient as a portion of the PUCCH symbol (e.g., in time-domain) is not used. As such, the network entity may enable the small PUCCH from the first user and the small PUCCH from the second user to be CDMed by assigning each user with a corresponding cover code. For example, the network entity may assign the first user with a first cover code (e.g., W0, W1, W2, W3) and assign the second user with a second cover code (e.g., X0, X1, X2, X3).

After the first user obtains its cover code, as shown at 910, the first user may apply its cover code (e.g., W0, W1, W2, W3) to its small PUCCH. Then, the first user may generate multiple coded copies of the small PUCCH based on the cover code. Different from the inter-PUCCH symbol CDM described in connection with FIG. 8, coded repetitions of the small PUCCH may be within a symbol. For example, as shown at 912, the first user may generate a first coded copy of the small PUCCH based on the cover code W0, and as shown at 914, the first user may generate a second coded copy of the PUCCH based on the cover code W1. However, both the first coded copy and the second coded copy may be within the same PUCCH symbol. Similarly, as shown at 916, the first user may generate a third coded copy of the small PUCCH based on the cover code W2, and as shown at 918, the first user may generate a fourth coded copy of the PUCCH based on the cover code W3. Both the third coded copy and the fourth coded copy may be within the same symbol (e.g., the subsequent symbol).

As shown at 920, the second user may perform similar steps as the first user and apply its cover code (e.g., X0, X1, X2, X3) to its small PUCCH. Similarly, the second user may generate two coded copies of its small PUCCH for a first symbol and two coded copies of the small PUCCH for a second (subsequent) symbol. Then, after all users (e.g., the first user and the second user) generated their corresponding coded copies of the small PUCCH using their cover codes, as shown at 922, the users may transmit their coded copies of the small PUCCH to the network entity based on CDM (which may be referred to as CDM transmissions).

The network entity may receive the coded copies of the small PUCCH from all users as a combined data based on the CDM transmission. Similarly, to recover/detect the corresponding small PUCCH of each user, the network entity may apply the corresponding cover code to the combined data received in a revered manner. For example, if the network entity is to recover/detect the small PUCCH transmitted by the first user, the network entity may multiply the combined data with the cover code (e.g., W0, W1, W2, W3) and add them together to obtain the small PUCCH transmitted from the first user. On the other hand, if the network entity is to recover/detect the small PUCCH transmitted by the second user, the network entity may multiply the combined data with the cover code (e.g., X0, X1, X2, X3) and add them together to obtain the small PUCCH transmitted from the second user.

Figure 10:
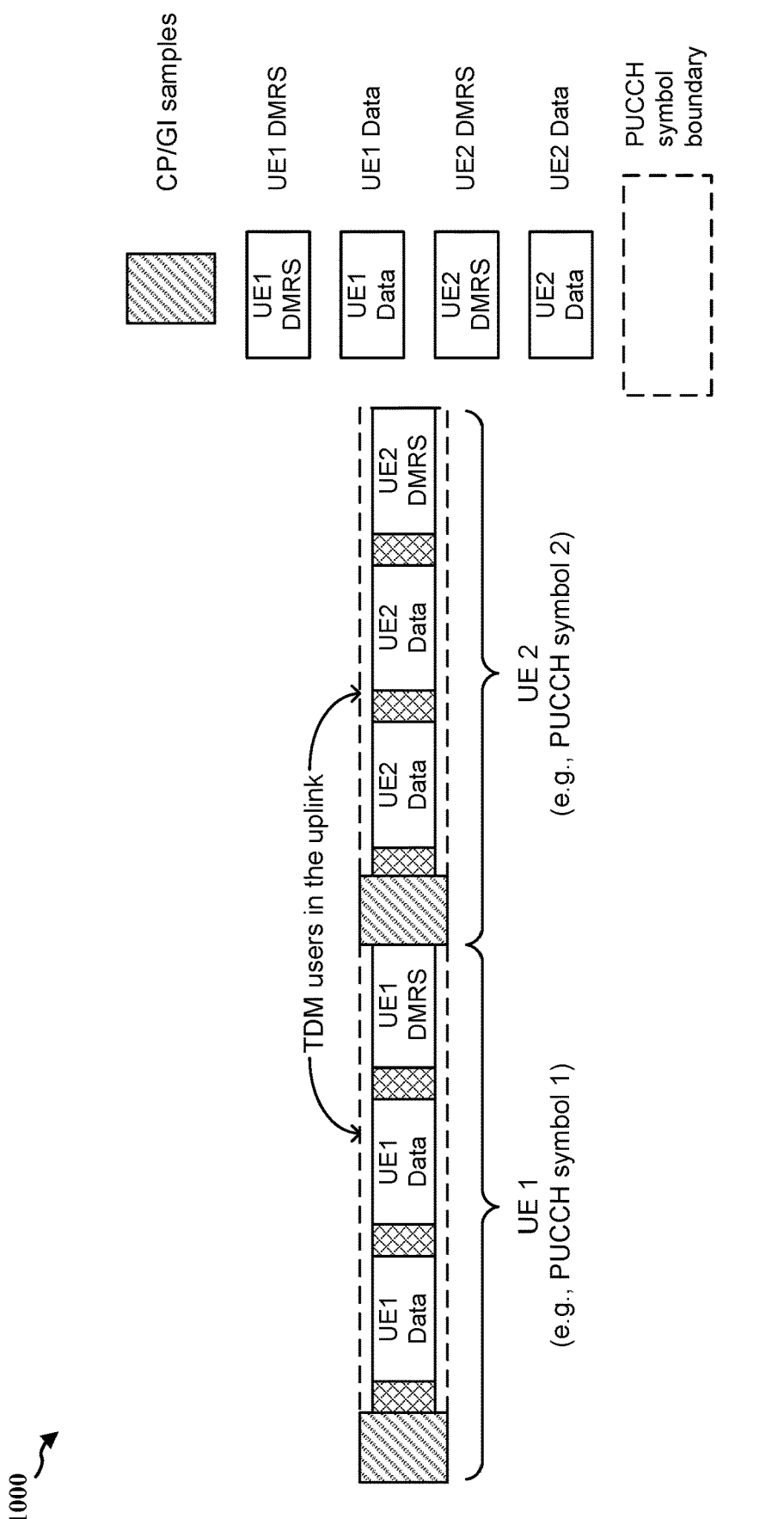
FIG. 10 is a diagram illustrating an example of multiplexing PUCCH symbols from multiple users based on time-division multiplexing (TDM) in accordance with various aspects of the present disclosure.

FIG. 10 is a diagram 1000 illustrating an example of multiplexing PUCCH symbols from multiple users based on time-division multiplexing (TDM) in accordance with various aspects of the present disclosure. In some examples, to reduce design/implementation complexity, PUCCH symbols transmitted from different users may be multiplexed based on TDM. For example, if each of a first user and a second user has one PUCCH symbol to transmit, the first user may be configured to transmit its PUCCH symbol on a first symbol, and the second user may be configured to transmit its PUCCH symbol on a second (or a subsequent) symbol, such that there are no overlaps between the PUCCH symbol transmissions from the first user and the second user.

In another aspect of the present disclosure, the cover code used by a UE (e.g., described in connection with FIGS. 8 and 9) may be orthogonal or non-orthogonal, and may be specified/configured by the network entity. In some scenarios, orthogonal cover codes may enable/provide interference free CDM. Example orthogonal cover codes may include a DFT code, a Zadoff-Chu sequence, a Hadamard sequence, etc. On the other hand, non-orthogonal cover codes may enable/provide more UEs to be multiplexed than orthogonal cover codes. Example non-orthogonal cover codes may include quadrature phase shift keying (QPSK) sequence, QAM sequence, etc. By using orthogonal or nearly orthogonal cover codes, more users may be CDMed on a set of time resources or more (different) ports of a UE may be CDMed on a set of time resources.

Figure 11:
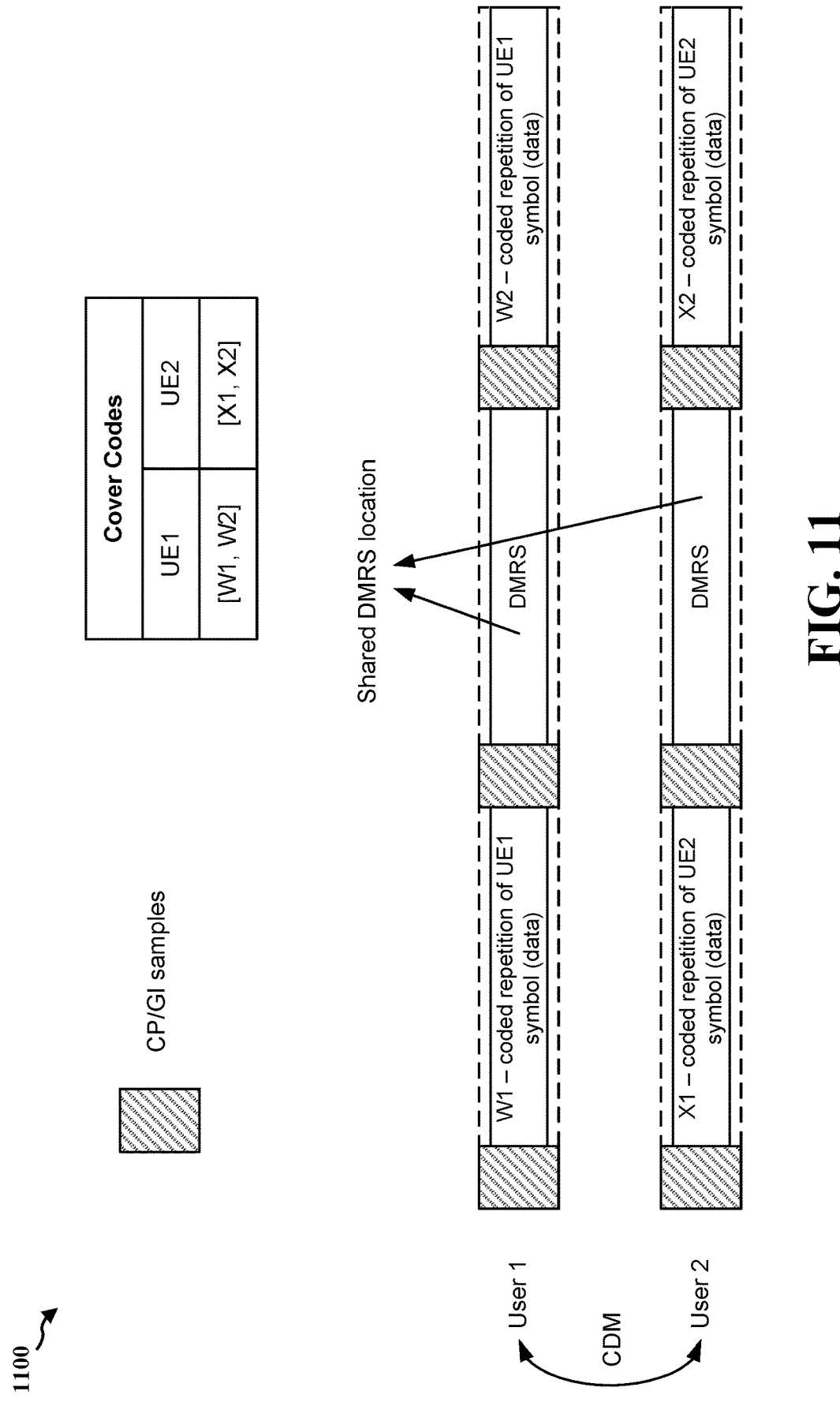
FIG. 11 is a diagram illustrating an example demodulation reference signal (DMRS) sharing among users with data sample blocks CDMed in accordance with various aspects of the present disclosure.

FIG. 11 is a diagram 1100 illustrating an example DMRS sharing among users with data sample blocks CDMed in accordance with various aspects of the present disclosure. In another aspect of the present disclosure, if orthogonal or nearly orthogonal DMRS sequences are used by some of the users/UEs, these users/UEs may share their DMRS locations while performing TDM or CDM across the data locations. For example, when transmissions from multiple users/UEs are CDMed based on orthogonal or nearly orthogonal cover codes, the RS (e.g., the DMRS) may also be orthogonal between the users/UEs. As such, a UE may skip applying cover code to the RS, and the RS or the RS location(s) may be shared among multiple users.

Figure 12:
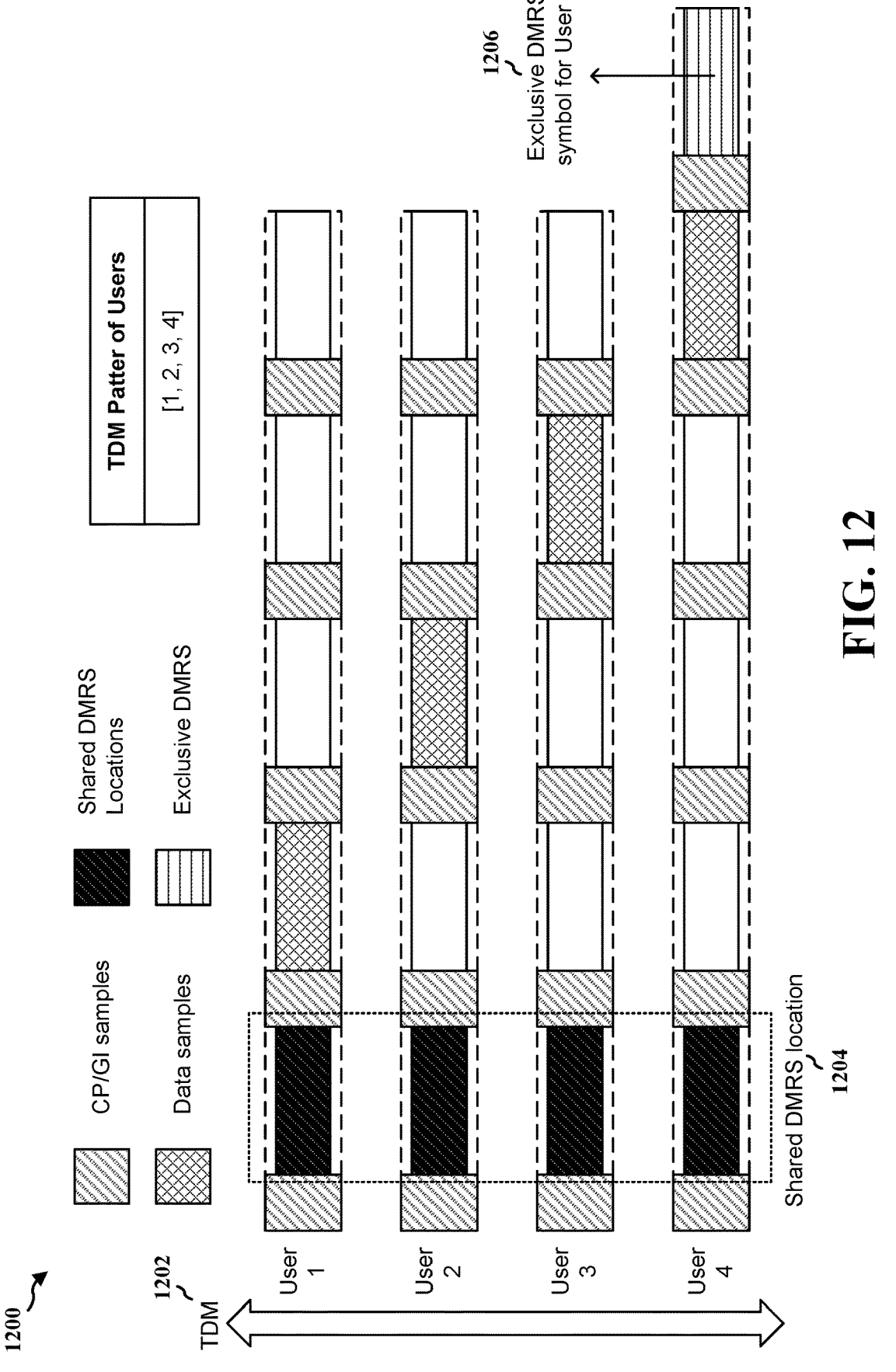
FIG. 12 is a diagram illustrating an example of a network entity allocating extra DMRS locations to some UEs in accordance with various aspects of the present disclosure.

FIG. 12 is a diagram 1200 illustrating an example of a network entity allocating extra DMRS locations (e.g., sample block or symbols) to some UEs if they are sharing the DMRS location with other users in a CDM/TDM group in accordance with various aspects of the present disclosure. In one example, as shown at 1202, a group of users (e.g., users 1 to 4) may be configured to transmit their data samples based on TDM, such as based on a TDM pattern [1, 2, 3, 4]. In other words, each user in the group of users may transmit its data samples using a symbol that is not used by another user in the group. In addition, as shown at 1204, the group of users may also share their DMRS with each other, which may be orthogonal or nearly orthogonal.

In some scenarios, a user may specify/request additional DMRS from the network entity. For example, due to TDM, the data samples to be transmitted by user 4 may be far from the shared DMRS location (e.g., three symbols apart), which means certain time periods may have elapsed since the shared DMRS. As such, as shown at 1206, the network entity may determine to configure an additional or exclusive DMRS for this user. This may alleviate the problem where some users may have a shorter coherence time and by the time their turn to transmit their data samples in the TDM arrives, the DMRS channel estimate may be out of date. To prevent this, network may allocate extra PUCCH symbols for DMRS or reserve extra sample blocks inside an existing allocation for DMRS samples. In some examples, a UE may be configured to jointly process both the shared DMRS and the additional/exclusive DMRS (e.g., if the channel correlation is known), or the UE may be configured to just process the additional/exclusive DMRS.

FIG. 13 is a flowchart 1300 of a method of wireless communication. The method may be performed by a UE (e.g., the UE 104, 704; the apparatus 1504). The method may enable the UE to transmit a PUCCH formed by a flexible concatenation of different types of blocks, such as one or more data sample blocks, one or more RS blocks, and/or one or more gap blocks within a PUCCH symbol. Such PUCCH format may be more suitable for SC waveforms.

At 1302, the UE may receive, from a network entity, an indication to transmit one or more PUCCH symbols that are associated with a coherent PUCCH format, where each PUCCH symbol of the one or more PUCCH symbols associated with the coherent PUCCH format includes at least one RS sample block, at least one data sample block, or at least one gap sample block multiplexed in time-domain, such as described in connection with FIGS. 4, 5, 6A, 6B, and 7. For example, as shown at 710 of FIG. 7, the UE 704 may receive an indication from the network entity 702 to transmit PUCCH symbol(s) based on a coherent PUCCH format, where each PUCCH symbol includes at least one RS sample block, at least one data sample block, or at least one gap sample block multiplexed in time-domain. The reception of the indication to transmit one or more PUCCH symbols that are associated with a coherent PUCCH format may be performed by, e.g., the PUCCH configuration component 198, the application processor 1506, the cellular baseband processor 1524, and/or the transceiver(s) 1522 of the apparatus 1504 in FIG. 15.

At 1310, the UE may transmit, for the network entity, the one or more PUCCH symbols, such as described in connection with FIGS. 4, 5, 6A, 6B, and 7-12. For example, as shown at 712 of FIG. 7, the UE 704 may transmit one or more PUCCH symbols to the network entity 702 based on the coherent PUCCH format. The transmission of the one or more PUCCH symbols may be performed by, e.g., the PUCCH configuration component 198, the application processor 1506, the cellular baseband processor 1524, and/or the transceiver(s) 1522 of the apparatus 1504 in FIG. 15.

In one example, each PUCCH symbol in the one or more PUCCH symbols may correspond to a time-domain entity (e.g., a unit of time) with at least one of a CP or at least one GI, such as described in connection with FIG. 4.

In another example, each PUCCH symbol of the one or more PUCCH symbols associated with the coherent PUCCH format includes one RS sample block and one data sample block that are separated by one gap sample block, such as described in connection with FIGS. 4 and 5.

In another example, the at least one RS sample block is associated with a set of RSs, the at least one data sample block is associated with modulated samples, and the at least one gap sample block is associated with zero value or known value samples.

In another example, at 1304, the UE may receive, from the network entity, a configuration configuring at least one of: a number of samples for each sample block in the at least one RS sample block, the at least one data sample block, or the at least one gap sample block; an order for sample blocks among the at least one RS sample block, the at least one data sample block, or the at least one gap sample block; or a location of the one or more PUCCH symbols in a slot, such as described in connection with FIG. 7. For example, as shown at 706 of FIG. 7, the number, type, order, and/or size of sample blocks in a PUCCH (e.g., the PUCCH using the coherent PUCCH format) may be configured for the UE 704 by the network entity 702.

In another example, each sample block in the at least one RS sample block, the at least one data sample block, or the at least one gap sample block may correspond to a set of contiguous samples in the time-domain.

In another example, each data sample block in the at least one data sample block is associated with at least one corresponding RS sample block with one or more common spatial parameters that are used for channel estimation. In some implementations, the at least one RS sample block, the at least one data sample block, or the at least one gap sample block may include at least two sample blocks that are associated with different spatial parameters, such as described in connection with FIG. 6A.

In another example, to transmit the one or more PUCCH symbols, the UE may transmit the one or more PUCCH symbols based on CDM in the time-domain using a cover code, such as described in connection with FIGS. 8 and 9. In some examples, the cover code may be orthogonal or nearly orthogonal in the time-domain.

In another example, at 1306, the UE may share one or more locations of the at least one RS sample block with at least one second UE, such as described in connection with FIGS. 11 and 12. In some implementations, at 1308, the UE may receive, from the network entity, additional RS sample block allocations based on sharing the one or more locations of the at least one RS sample block with the at least one second UE, such as described in connection with FIG. 12.

In another example, to transmit the one or more PUCCH symbols based on the coherent PUCCH forma, the UE may transmit the one or more PUCCH symbols based on TDM with at least one second UE or using different ports of the UE.

FIG. 14 is a flowchart 1400 of a method of wireless communication. The method may be performed by a UE (e.g., the UE 104, 704; the apparatus 1504). The method may enable the UE to transmit a PUCCH formed by a flexible concatenation of different types of blocks, such as one or more data sample blocks, one or more RS blocks, and/or one or more gap blocks within a PUCCH symbol. Such PUCCH format may be more suitable for SC waveforms.

At 1402, the UE may receive, from a network entity, an indication to transmit one or more PUCCH symbols that are associated with a coherent PUCCH format, where each PUCCH symbol of the one or more PUCCH symbols associated with the coherent PUCCH format includes at least one RS sample block, at least one data sample block, or at least one gap sample block multiplexed in time-domain, such as described in connection with FIGS. 4, 5, 6A, 6B, and 7. For example, as shown at 710 of FIG. 7, the UE 704 may receive an indication from the network entity 702 to transmit PUCCH symbol(s) based on a coherent PUCCH format, where each PUCCH symbol includes at least one RS sample block, at least one data sample block, or at least one gap sample block multiplexed in time-domain. The reception of the indication to transmit one or more PUCCH symbols that are associated with a coherent PUCCH format may be performed by, e.g., the PUCCH configuration component 198, the application processor 1506, the cellular baseband processor 1524, and/or the transceiver(s) 1522 of the apparatus 1504 in FIG. 15.

At 1410, the UE may transmit, for the network entity, the one or more PUCCH symbols, such as described in connection with FIGS. 4, 5, 6A, 6B, and 7-12. For example, as shown at 712 of FIG. 7, the UE 704 may transmit one or more PUCCH symbols to the network entity 702 based on the coherent PUCCH format. The transmission of the one or more PUCCH symbols may be performed by, e.g., the PUCCH configuration component 198, the application processor 1506, the cellular baseband processor 1524, and/or the transceiver(s) 1522 of the apparatus 1504 in FIG. 15.

In one example, each PUCCH symbol in the one or more PUCCH symbols may correspond to a time-domain entity (e.g., a unit of time) with at least one of a CP or at least one GI, such as described in connection with FIG. 4.

In another example, each PUCCH symbol of the one or more PUCCH symbols associated with the coherent PUCCH format includes one RS sample block and one data sample block that are separated by one gap sample block, such as described in connection with FIGS. 4 and 5.

In another example, the at least one RS sample block is associated with a set of RSs, the at least one data sample block is associated with modulated samples, and the at least one gap sample block is associated with zero value or known value samples.

In another example, the UE may receive, from the network entity, a configuration configuring at least one of: a number of samples for each sample block in the at least one RS sample block, the at least one data sample block, or the at least one gap sample block; an order for sample blocks among the at least one RS sample block, the at least one data sample block, or the at least one gap sample block; or a location of the one or more PUCCH symbols in a slot, such as described in connection with FIG. 7. For example, as shown at 706 of FIG. 7, the number, type, order, and/or size of sample blocks in a PUCCH (e.g., the PUCCH using the coherent PUCCH format) may be configured for the UE 704 by the network entity 702.

In another example, each sample block in the at least one RS sample block, the at least one data sample block, or the at least one gap sample block may correspond to a set of contiguous samples in the time-domain.

In another example, each data sample block in the at least one data sample block is associated with at least one corresponding RS sample block with one or more common spatial parameters that are used for channel estimation. In some implementations, the at least one RS sample block, the at least one data sample block, or the at least one gap sample block may include at least two sample blocks that are associated with different spatial parameters, such as described in connection with FIG. 6A.

In another example, to transmit the one or more PUCCH symbols, the UE may transmit the one or more PUCCH symbols based on CDM in the time-domain using a cover code, such as described in connection with FIGS. 8 and 9. In some examples, the cover code may be orthogonal or nearly orthogonal in the time-domain.

In another example, the UE may share one or more locations of the at least one RS sample block with at least one second UE, such as described in connection with FIGS. 11 and 12. In some implementations, the UE may receive, from the network entity, additional RS sample block allocations based on sharing the one or more locations of the at least one RS sample block with the at least one second UE, such as described in connection with FIG. 12.

In another example, to transmit the one or more PUCCH symbols based on the coherent PUCCH forma, the UE may transmit the one or more PUCCH symbols based on TDM with at least one second UE or using different ports of the UE.

Figure 15:
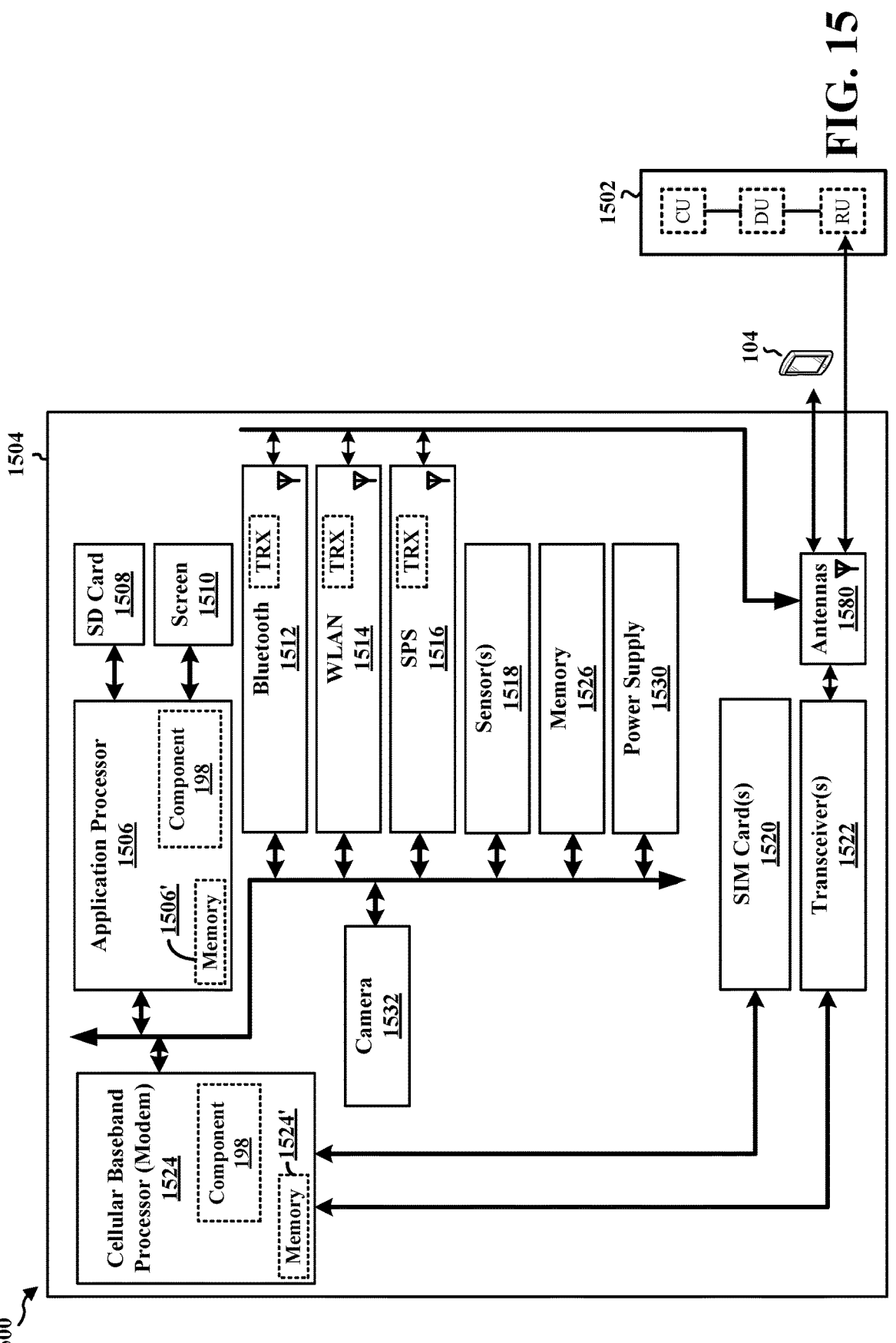
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see UE 350 of FIG. 3) and include the additional modules of the apparatus 1504.

As discussed supra, the PUCCH configuration component 198 may be configured to receive, from a network entity, an indication to transmit one or more PUCCH symbols that are associated with a coherent PUCCH format, where each PUCCH symbol of the one or more PUCCH symbols associated with the coherent PUCCH format includes at least one RS sample block, at least one data sample block, or at least one gap sample block multiplexed in time-domain. The PUCCH configuration component 198 may also be configured to transmit, for the network entity, the one or more PUCCH symbols. The PUCCH configuration component 198 may be within the cellular baseband processor 1524, the application processor 1506, or both the cellular baseband processor 1524 and the application processor 1506. The PUCCH configuration component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, may include means for receiving, from a network entity, an indication to transmit one or more PUCCH symbols that are associated with a coherent PUCCH format, where each PUCCH symbol of the one or more PUCCH symbols associated with the coherent PUCCH format includes at least one RS sample block, at least one data sample block, or at least one gap sample block multiplexed in time-domain. The apparatus 1504 may further include means for transmitting, for the network entity, the one or more PUCCH symbols.

In one configuration, each PUCCH symbol in the one or more PUCCH symbols may correspond to a time-domain entity with at least one of a CP or at least one GI.

In another configuration, each PUCCH symbol of the one or more PUCCH symbols associated with the coherent PUCCH format includes one RS sample block and one data sample block that are separated by one gap sample block.

In another configuration, the at least one RS sample block is associated with a set of RSs, the at least one data sample block is associated with modulated samples, and the at least one gap sample block is associated with zero value or known value samples.

In another configuration, the apparatus 1504 may further include means for receiving, from the network entity, a configuration configuring at least one of: a number of samples for each sample block in the at least one RS sample block, the at least one data sample block, or the at least one gap sample block; an order for sample blocks among the at least one RS sample block, the at least one data sample block, or the at least one gap sample block; or a location of the one or more PUCCH symbols in a slot.

In another configuration, each sample block in the at least one RS sample block, the at least one data sample block, or the at least one gap sample block may correspond to a set of contiguous samples in the time-domain.

In another configuration, each data sample block in the at least one data sample block is associated with at least one corresponding RS sample block with one or more common spatial parameters that are used for channel estimation. In some implementations, the at least one RS sample block, the at least one data sample block, or the at least one gap sample block may include at least two sample blocks that are associated with different spatial parameters.

In another configuration, the means for transmitting the one or more PUCCH symbols includes configuring the apparatus 1504 to transmit the one or more PUCCH symbols based on CDM in the time-domain using a cover code. In some implementations, the cover code may be orthogonal or nearly orthogonal in the time-domain.

In another configuration, the apparatus 1504 may further include means for sharing one or more locations of the at least one RS sample block with at least one second UE. In some implementations, the apparatus 1504 may further include means for receiving, from the network entity, additional RS sample block allocations based on sharing the one or more locations of the at least one RS sample block with the at least one second UE, such as described in connection with FIG. 12.

In another configuration, the means for transmitting the one or more PUCCH symbols includes configuring the apparatus 1504 to transmit the one or more PUCCH symbols based on TDM with at least one second UE or using different ports of the apparatus 1504.

The means may be the PUCCH configuration component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

FIG. 16 is a flowchart 1600 of a method of wireless communication. The method may be performed by a network entity (e.g., the base station 102; the network entity 702, 1802). The method may enable the network entity to configure and/or indicate a UE to transmit a PUCCH formed by a flexible concatenation of different types of blocks, such as one or more data sample blocks, one or more RS blocks, and/or one or more gap blocks within a PUCCH symbol.

At 1602, the network entity may transmit, for a UE, an indication to transmit one or more PUCCH symbols that are associated with a coherent PUCCH format, where each PUCCH symbol of the one or more PUCCH symbols associated with the coherent PUCCH format includes at least one RS sample block, at least one data sample block, or at least one gap sample block multiplexed in time-domain, such as described in connection with FIGS. 4, 5, 6A, 6B, and 7. For example, as shown at 710 of FIG. 7, the network entity 702 may transmit an indication to the UE 704 to transmit PUCCH symbol(s) based on a coherent PUCCH format, where each PUCCH symbol includes at least one RS sample block, at least one data sample block, or at least one gap sample block multiplexed in time-domain. The transmission of the indication may be performed by, e.g., the PUCCH format indication component 199, the RU processor 1842, and/or the transceiver(s) 1846 of the network entity 1802 in FIG. 18.

At 1610, the network entity may receive, from the UE, the one or more PUCCH symbols, such as described in connection with FIGS. 4, 5, 6A, 6B, and 7-12. For example, as shown at 712 of FIG. 7, the network entity 702 may receive one or more PUCCH symbols from the UE 704. The reception of the one or more PUCCH symbols may be performed by, e.g., the PUCCH format indication component 199, the RU processor 1842, and/or the transceiver(s) 1846 of the network entity 1802 in FIG. 18.

In one example, each PUCCH symbol in the one or more PUCCH symbols may correspond to a time-domain entity (e.g., a unit of time) with at least one of a CP or at least one GI, such as described in connection with FIG. 4.

In another example, the at least one RS sample block, each PUCCH symbol of the one or more PUCCH symbols associated with the coherent PUCCH format includes one RS sample block and one data sample block that are separated by one gap sample block, such as described in connection with FIGS. 4 and 5.

In another example, the at least one RS sample block is associated with a set of RSs, the at least one data sample block is associated with modulated samples, and the at least one gap sample block is associated with zero value or known value samples.

In another example, at 1604, the network entity may transmit, to the UE, a configuration configuring at least one of: a number of samples for each sample block in the at least one RS sample block, the at least one data sample block, or the at least one gap sample block; an order for sample blocks among the at least one RS sample block, the at least one data sample block, or the at least one gap sample block; or a location of the one or more PUCCH symbols in a slot, such as described in connection with FIG. 7. For example, as shown at 706 of FIG. 7, the number, type, order, and/or size of sample blocks in a PUCCH (e.g., the PUCCH using the coherent PUCCH format) may be configured for the UE 704 by the network entity 702.

In another example, each sample block in the at least one RS sample block, the at least one data sample block, or the at least one gap sample block may correspond to a set of contiguous samples in the time-domain.

In another example, each data sample block in the at least one data sample block is associated with at least one corresponding RS sample block with one or more common spatial parameters that are used for channel estimation. In some implementations, the at least one RS sample block, the at least one data sample block, or the at least one gap sample block may include at least two sample blocks that are associated with different spatial parameters, such as described in connection with FIG. 6A.

In another example, to receive the one or more PUCCH symbols, the network entity may receive the one or more PUCCH symbols based on CDM in the time-domain with PUCCH symbols from at least a second UE or from multiple ports of the UE.

In another example, at 1606, the network entity may transmit a cover code for the CDM to the UE, where the cover code is orthogonal or nearly orthogonal in the time-domain.

In another example, at 1608, the network entity may configure, for the UE, additional RS sample block allocations based on the UE sharing one or more locations of the at least one RS sample block with at least one second UE.

In another example, to receive the one or more PUCCH symbols, the network entity may receive the one or more PUCCH symbols based on time division multiplexing (TDM) with PUCCH symbols from at least a second UE or from multiple ports of the UE.

FIG. 17 is a flowchart 1700 of a method of wireless communication. The method may be performed by a network entity (e.g., the base station 102; the network entity 702, 1802). The method may enable the network entity to configure and/or indicate a UE to transmit a PUCCH formed by a flexible concatenation of different types of blocks, such as one or more data sample blocks, one or more RS blocks, and/or one or more gap blocks within a PUCCH symbol.

At 1702, the network entity may transmit, for a UE, an indication to transmit one or more PUCCH symbols that are associated with a coherent PUCCH format, where each PUCCH symbol of the one or more PUCCH symbols associated with the coherent PUCCH format includes at least one RS sample block, at least one data sample block, or at least one gap sample block multiplexed in time-domain, such as described in connection with FIGS. 4, 5, 6A, 6B, and 7. For example, as shown at 710 of FIG. 7, the network entity 702 may transmit an indication to the UE 704 to transmit PUCCH symbol(s) based on a coherent PUCCH format, where each PUCCH symbol includes at least one RS sample block, at least one data sample block, or at least one gap sample block multiplexed in time-domain. The transmission of the indication may be performed by, e.g., the PUCCH format indication component 199, the RU processor 1842, and/or the transceiver(s) 1846 of the network entity 1802 in FIG. 18.

At 1710, the network entity may receive, from the UE, the one or more PUCCH symbols, such as described in connection with FIGS. 4, 5, 6A, 6B, and 7-12. For example, as shown at 712 of FIG. 7, the network entity 702 may receive one or more PUCCH symbols from the UE 704. The reception of the one or more PUCCH symbols may be performed by, e.g., the PUCCH format indication component 199, the RU processor 1842, and/or the transceiver(s) 1846 of the network entity 1802 in FIG. 18.

In one example, each PUCCH symbol in the one or more PUCCH symbols may correspond to a time-domain entity (e.g., a unit of time) with at least one of a CP or at least one GI, such as described in connection with FIG. 4.

In another example, the at least one RS sample block, each PUCCH symbol of the one or more PUCCH symbols associated with the coherent PUCCH format includes one RS sample block and one data sample block that are separated by one gap sample block, such as described in connection with FIGS. 4 and 5.

In another example, the at least one RS sample block is associated with a set of RSs, the at least one data sample block is associated with modulated samples, and the at least one gap sample block is associated with zero value or known value samples.

In another example, the network entity may transmit, to the UE, a configuration configuring at least one of: a number of samples for each sample block in the at least one RS sample block, the at least one data sample block, or the at least one gap sample block; an order for sample blocks among the at least one RS sample block, the at least one data sample block, or the at least one gap sample block; or a location of the one or more PUCCH symbols in a slot, such as described in connection with FIG. 7. For example, as shown at 706 of FIG. 7, the number, type, order, and/or size of sample blocks in a PUCCH (e.g., the PUCCH using the coherent PUCCH format) may be configured for the UE 704 by the network entity 702.

In another example, each sample block in the at least one RS sample block, the at least one data sample block, or the at least one gap sample block may correspond to a set of contiguous samples in the time-domain.

In another example, each data sample block in the at least one data sample block is associated with at least one corresponding RS sample block with one or more common spatial parameters that are used for channel estimation. In some implementations, the at least one RS sample block, the at least one data sample block, or the at least one gap sample block may include at least two sample blocks that are associated with different spatial parameters, such as described in connection with FIG. 6A.

In another example, to receive the one or more PUCCH symbols, the network entity may receive the one or more PUCCH symbols based on CDM in the time-domain with PUCCH symbols from at least a second UE or from multiple ports of the UE.

In another example, the network entity may transmit a cover code for the CDM to the UE, where the cover code is orthogonal or nearly orthogonal in the time-domain.

In another example, the network entity may configure, for the UE, additional RS sample block allocations based on the UE sharing one or more locations of the at least one RS sample block with at least one second UE.

In another example, to receive the one or more PUCCH symbols, the network entity may receive the one or more PUCCH symbols based on time division multiplexing (TDM) with PUCCH symbols from at least a second UE or from multiple ports of the UE.

Figure 18:
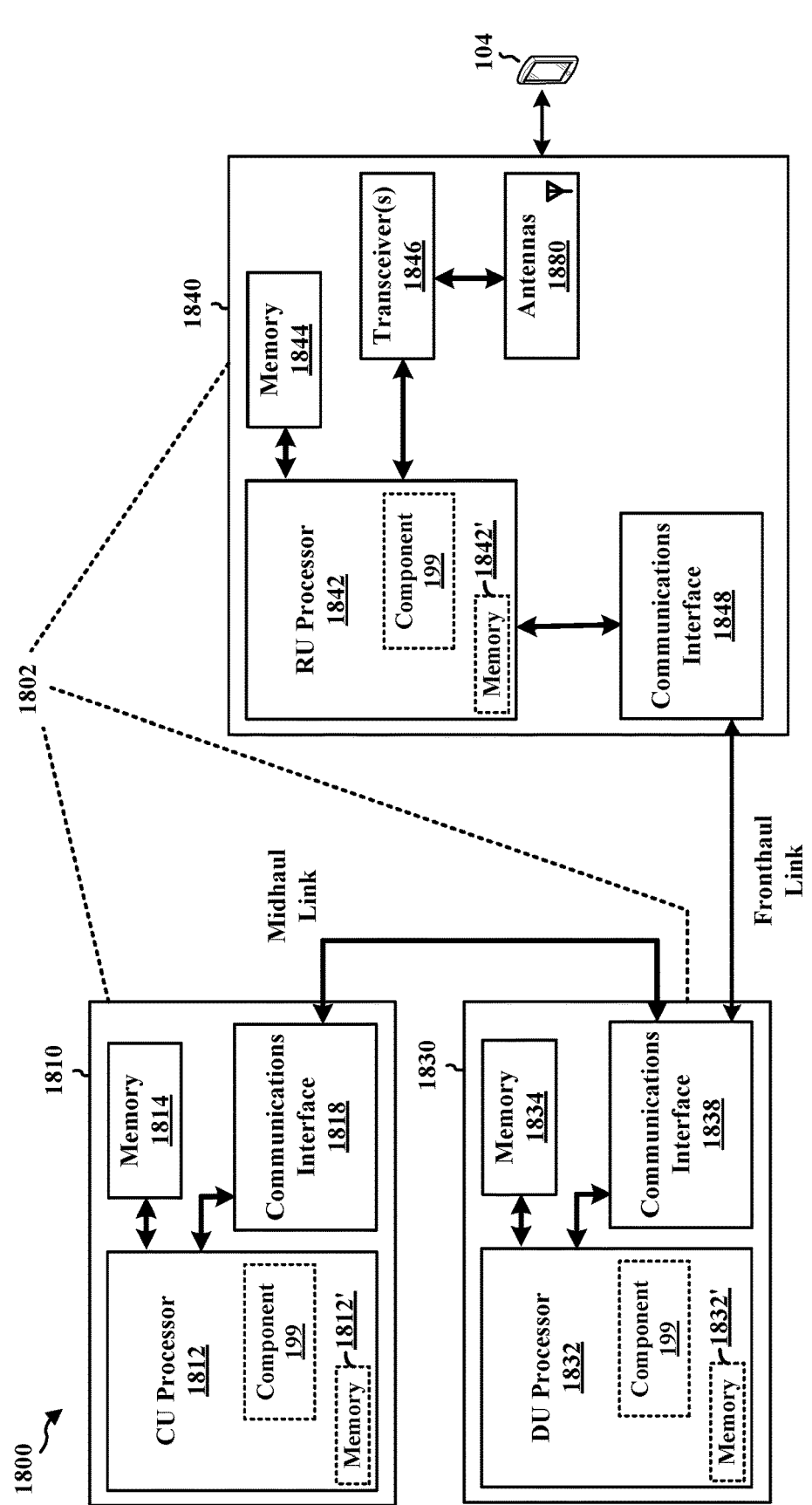
FIG. 18 is a diagram illustrating an example of a hardware implementation for an example network entity.

FIG. 18 is a diagram 1800 illustrating an example of a hardware implementation for a network entity 1802. The network entity 1802 may be a BS, a component of a BS, or may implement BS functionality. The network entity 1802 may include at least one of a CU 1810, a DU 1830, or an RU 1840. For example, depending on the layer functionality handled by the PUCCH format indication component 199, the network entity 1802 may include the CU 1810; both the CU 1810 and the DU 1830; each of the CU 1810, the DU 1830, and the RU 1840; the DU 1830; both the DU 1830 and the RU 1840; or the RU 1840. The CU 1810 may include a CU processor 1812. The CU processor 1812 may include on-chip memory 1812'. In some aspects, the CU 1810 may further include additional memory modules 1814 and a communications interface 1818. The CU 1810 communicates with the DU 1830 through a midhaul link, such as an F1 interface. The DU 1830 may include a DU processor 1832. The DU processor 1832 may include on-chip memory 1832'. In some aspects, the DU 1830 may further include additional memory modules 1834 and a communications interface 1838. The DU 1830 communicates with the RU 1840 through a fronthaul link. The RU 1840 may include an RU processor 1842. The RU processor 1842 may include on-chip memory 1842'. In some aspects, the RU 1840 may further include additional memory modules 1844, one or more transceivers 1846, antennas 1880, and a communications interface 1848. The RU 1840 communicates with the UE 104. The on-chip memory 1812', 1832', 1842' and the additional memory modules 1814, 1834, 1844 may each be considered a computer-readable medium/memory. Each computer-readable medium/memory may be non-transitory. Each of the processors 1812, 1832, 1842 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the PUCCH format indication component 199 may be configured to transmit, for a UE, an indication to transmit one or more PUCCH symbols that are associated with a coherent PUCCH format, where each PUCCH symbol of the one or more PUCCH symbols associated with the coherent PUCCH format includes at least one RS sample block, at least one data sample block, or at least one gap sample block multiplexed in time-domain. The PUCCH format indication component 199 may also be configured to receive, from the UE, the one or more PUCCH symbols. The PUCCH format indication component 199 may be within one or more processors of one or more of the CU 1810, DU 1830, and the RU 1840. The PUCCH format indication component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1802 may include a variety of components configured for various functions. In one configuration, the network entity 1802 may include means for transmitting, for a UE, an indication to transmit one or more PUCCH symbols that are associated with a coherent PUCCH format, where each PUCCH symbol of the one or more PUCCH symbols associated with the coherent PUCCH format includes at least one RS sample block, at least one data sample block, or at least one gap sample block multiplexed in time-domain. The network entity 1802 may further include means for receiving, from the UE, the one or more PUCCH symbols.

In one configuration, each PUCCH symbol in the one or more PUCCH symbols may correspond to a time-domain entity with at least one of a CP or at least one GI.

In another configuration, each PUCCH symbol of the one or more PUCCH symbols associated with the coherent PUCCH format includes one RS sample block and one data sample block that are separated by one gap sample block.

In another configuration, the at least one RS sample block is associated with a set of RSs, the at least one data sample block is associated with modulated samples, and the at least one gap sample block is associated with zero value or known value samples.

In another configuration, each sample block in the at least one RS sample block, the at least one data sample block, or the at least one gap sample block may correspond to a set of contiguous samples in the time-domain.

In another configuration, each data sample block in the at least one data sample block is associated with at least one corresponding RS sample block with one or more common spatial parameters that are used for channel estimation. In some implementations, the at least one RS sample block, the at least one data sample block, or the at least one gap sample block may include at least two sample blocks that are associated with different spatial parameters.

In another example, the means for receiving the one or more PUCCH symbols includes configuring the network entity 1802 to receive the one or more PUCCH symbols based on CDM in the time-domain with PUCCH symbols from at least a second UE or from multiple ports of the UE.

In another example, the network entity 1802 may further include means for configuring, for the UE, additional RS sample block allocations based on the UE sharing one or more locations of the at least one RS sample block with at least one second UE.

In another example, the means for receiving the one or more PUCCH symbols includes configuring the network entity 1802 to receive the one or more PUCCH symbols based on TDM with PUCCH symbols from at least a second UE or from multiple ports of the UE.

The means may be the PUCCH format indication component 199 of the network entity 1802 configured to perform the functions recited by the means. As described supra, the network entity 1802 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: receiving, from a network entity, an indication to transmit one or more PUCCH symbols that are associated with a coherent PUCCH format, where each PUCCH symbol of the one or more PUCCH symbols associated with the coherent PUCCH format includes at least one RS sample block, at least one data sample block, or at least one gap sample block multiplexed in time-domain; and transmitting, for the network entity, the one or more PUCCH symbols.

Aspect 2 is the method of aspect 1, where each PUCCH symbol in the one or more PUCCH symbols corresponds to a time-domain entity with at least one of a CP or at a GI.

Aspect 3 is the method of aspect 1 or 2, where each PUCCH symbol of the one or more PUCCH symbols associated with the coherent PUCCH format includes one RS sample block and one data sample block that are separated by one gap sample block.

Aspect 4 is the method of any of aspects 1 to 3, where the at least one RS sample block is associated with a set of RSs, the at least one data sample block is associated with modulated samples, and the at least one gap sample block is associated with zero value or known value samples.

Aspect 5 is the method of any of aspects 1 to 4, further including receiving, from the network entity, a configuration configuring at least one of: a number of samples for each sample block in the at least one RS sample block, the at least one data sample block, or the at least one gap sample block; an order for sample blocks among the at least one RS sample block, the at least one data sample block, or the at least one gap sample block; or a location of the one or more PUCCH symbols in a slot.

Aspect 6 is the method of any of aspects 1 to 5, where each sample block in the at least one RS sample block, the at least one data sample block, or the at least one gap sample block corresponds to a set of contiguous samples in the time-domain.

Aspect 7 is the method of any of aspects 1 to 6, where each data sample block in the at least one data sample block is associated with at least one corresponding RS sample block with one or more common spatial parameters that are used for channel estimation.

Aspect 8 is the method of aspect 7, where the at least one RS sample block, the at least one data sample block, or the at least one gap sample block include at least two sample blocks that are associated with different spatial parameters.

Aspect 9 is the method of any of aspects 1 to 8, where transmitting the one or more PUCCH symbols includes: transmitting the one or more PUCCH symbols based on CDM in the time-domain using a cover code.

Aspect 10 is the method of aspect 9, where the cover code is orthogonal or nearly orthogonal in the time-domain.

Aspect 11 is the method of any of aspects 1 to 10, further including: sharing one or more locations of the at least one RS sample block with at least one second UE.

Aspect 12 is the method of aspect 11, further including: receiving, from the network entity, additional RS sample block allocations based on sharing the one or more locations of the at least one RS sample block with the at least one second UE.

Aspect 13 is the method of any of aspects 1 to 12, where transmitting the one or more PUCCH symbols based on the coherent PUCCH format includes: transmit the one or more PUCCH symbols based on TDM with at least one second UE or using different ports of the UE.

Aspect 14 is the method of any of aspects 1 to 13, where the coherent PUCCH format is associated with a set of single-carrier waveforms.

Aspect 15 is an apparatus for wireless communication at a UE, including: a memory; and at least one processor coupled to the memory and, based at least in part on information stored in the memory, the at least one processor is configured to implement any of aspects 1 to 14.

Aspect 16 is the apparatus of aspect 15, further including at least one of a transceiver or an antenna coupled to the at least one processor.

Aspect 17 is an apparatus for wireless communication including means for implementing any of aspects 1 to 14.

Aspect 18 is a computer-readable medium (e.g., a non-transitory computer-readable medium) storing computer executable code, where the code when executed by a processor causes the processor to implement any of aspects 1 to 14.

Aspect 19 is a method of wireless communication at a network entity, including: transmitting, for a UE, an indication to transmit one or more PUCCH symbols that are associated with a coherent PUCCH format, where each PUCCH symbol of the one or more PUCCH symbols associated with the coherent PUCCH format includes at least one RS sample block, at least one data sample block, or at least one gap sample block multiplexed in time-domain; and receiving, from the UE, the one or more PUCCH symbols.

Aspect 20 is the method of aspect 19, where each PUCCH symbol in the one or more PUCCH symbols corresponds to a time-domain entity with at least one of a CP or a GI.

Aspect 21 is the method of aspect 19 or 20, where each PUCCH symbol of the one or more PUCCH symbols associated with the coherent PUCCH format includes one RS sample block and one data sample block that are separated by one gap sample block.

Aspect 22 is the method of any of aspects 19 to 21, where the at least one RS sample block is associated with a set of RSs, the at least one data sample block is associated with modulated samples, and the at least one gap sample block is associated with zero value or known value samples.

Aspect 23 is the method of any of aspects 19 to 22, further including transmitting, to the UE, a configuration configuring at least one of: a number of samples for each sample block in the at least one RS sample block, the at least one data sample block, or the at least one gap sample block; an order for sample blocks among the at least one RS sample block, the at least one data sample block, or the at least one gap sample block; or a location of the one or more PUCCH symbols in a slot.

Aspect 24 is the method of any of aspects 19 to 23, where each sample block in the at least one RS sample block, the at least one data sample block, or the at least one gap sample block corresponds to a set of contiguous samples in the time-domain.

Aspect 25 is the method of any of aspects 19 to 24, where each data sample block in the at least one data sample block is associated with at least one corresponding RS sample block with one or more common spatial parameters that are used for channel estimation.

Aspect 26 is the method of aspect 25, where the at least one RS sample block, the at least one data sample block, or the at least one gap sample block include at least two sample blocks that are associated with different spatial parameters.

Aspect 27 is the method of any of aspects 19 to 26, where receiving the one or more PUCCH symbols includes: receiving the one or more PUCCH symbols based on CDM in the time-domain with PUCCH symbols from at least a second UE or from multiple ports of the UE.

Aspect 28 is the method of any of aspects 19 to 27, further including: configuring, for the UE, additional RS sample block allocations based on the UE sharing one or more locations of the at least one RS sample block with at least one second UE.

Aspect 29 is the method of any of aspects 19 to 28, where receiving the one or more PUCCH symbols includes: receiving the one or more PUCCH symbols based on TDM with PUCCH symbols from at least a second UE or from multiple ports of the UE.

Aspect 30 is an apparatus for wireless communication at a network entity, including: a memory; and at least one processor coupled to the memory and, based at least in part on information stored in the memory, the at least one processor is configured to implement any of aspects 19 to 29.

Aspect 31 is the apparatus of aspect 30, further including at least one of a transceiver or an antenna coupled to the at least one processor.

Aspect 32 is an apparatus for wireless communication including means for implementing any of aspects 19 to 29.

Aspect 33 is a computer-readable medium (e.g., a non-transitory computer-readable medium) storing computer executable code, where the code when executed by a processor causes the processor to implement any of aspects 19 to 29.

What is claimed is:

1. An apparatus for wireless communication at a user equipment (UE), comprising:

at least one memory; and at least one processor coupled to the at least one memory, wherein the at least one processor is configured to:

receive, from a network entity, an indication to transmit one or more physical uplink control channel (PUCCH) symbols that are associated with a coherent PUCCH format, wherein the coherent PUCCH format is associated with a set of time-domain single-carrier (SC) waveforms that does not use a discrete Fourier transform (DFT) or an inverse fast Fourier transform (IFFT), wherein each PUCCH symbol of the one or more PUCCH symbols associated with the coherent PUCCH format includes at least one reference signal (RS) sample block, at least one data sample block, or at least one gap sample block multiplexed in time-domain; and transmit, for the network entity, the one or more PUCCH symbols.

2. The apparatus of claim 1, wherein each PUCCH symbol in the one or more PUCCH symbols corresponds to a time-domain entity with at least one of a cyclic prefix (CP) or a guard interval (GI).

3. The apparatus of claim 1, wherein each PUCCH symbol of the one or more PUCCH symbols associated with the coherent PUCCH format includes one RS sample block and one data sample block that are separated by one gap sample block.

4. The apparatus of claim 1, wherein the at least one RS sample block is associated with a set of RSs, the at least one data sample block is associated with modulated samples, and the at least one gap sample block is associated with zero value or known value samples.

5. The apparatus of claim 1, wherein the at least one processor is further configured to receive, from the network entity, a configuration configuring at least one of:

a number of samples for each sample block in the at least one RS sample block, the at least one data sample block, or the at least one gap sample block;

an order for sample blocks among the at least one RS sample block, the at least one data sample block, or the at least one gap sample block; or a location of the one or more PUCCH symbols in a slot.

6. The apparatus of claim 1, wherein each sample block in the at least one RS sample block, the at least one data sample block, or the at least one gap sample block corresponds to a set of contiguous samples in the time-domain.

7. The apparatus of claim 1, wherein each data sample block in the at least one data sample block is associated with at least one corresponding RS sample block with one or more common spatial parameters that are used for channel estimation.

8. The apparatus of claim 7, wherein the at least one RS sample block, the at least one data sample block, or the at least one gap sample block include at least two sample blocks that are associated with different spatial parameters.

9. The apparatus of claim 1, wherein to transmit the one or more PUCCH symbols, the at least one processor is configured to:

transmit the one or more PUCCH symbols based on code division multiplexing (CDM) in the time-domain using a cover code.

10. The apparatus of claim 9, wherein the cover code is orthogonal or nearly orthogonal in the time-domain.

11. The apparatus of claim 1, wherein the at least one processor is further configured to:

share one or more locations of the at least one RS sample block with at least one second UE.

12. The apparatus of claim 11, wherein the at least one processor is further configured to:

receive, from the network entity, additional RS sample block allocations based on being configured to share the one or more locations of the at least one RS sample block with the at least one second UE.

13. The apparatus of claim 1, wherein to transmit the one or more PUCCH symbols, the at least one processor is configured to:

transmit the one or more PUCCH symbols based on time division multiplexing (TDM) with at least one second UE or using different ports of the UE.

14. A method of wireless communication at a user equipment (UE), comprising:

receiving, from a network entity, an indication to transmit one or more physical uplink control channel (PUCCH) symbols that are associated with a coherent PUCCH format, wherein the coherent PUCCH format is associated with a set of time-domain single-carrier (SC) waveforms that does not use a discrete Fourier transform (DFT) or an inverse fast Fourier transform (IFFT), wherein each PUCCH symbol of the one or more PUCCH symbols associated with the coherent PUCCH format includes at least one reference signal (RS) sample block, at least one data sample block, or at least one gap sample block multiplexed in time-domain; and transmitting, for the network entity, the one or more PUCCH symbols.

15. The method of claim 14, further comprising receiving, from the network entity, a configuration configuring at least one of:

a number of samples for each sample block in the at least one RS sample block, the at least one data sample block, or the at least one gap sample block;

an order for sample blocks among the at least one RS sample block, the at least one data sample block, or the at least one gap sample block; or a location of the one or more PUCCH symbols in a slot.

16. An apparatus for wireless communication at a network entity, comprising:

at least one memory; and at least one processor coupled to the at least one memory, wherein the at least one processor is configured to:

transmit, for a user equipment (UE), an indication to transmit one or more physical uplink control channel (PUCCH) symbols that are associated with a coherent PUCCH format, wherein the coherent PUCCH format is associated with a set of time domain single-carrier (SC) waveforms that does not use a discrete Fourier transform (DFT) or an inverse fast Fourier transform (IFFT), wherein each PUCCH symbol of the one or more PUCCH symbols associated with the coherent PUCCH format includes at least one reference signal (RS) sample block, at least one data sample block, or at least one gap sample block multiplexed in time-domain; and receive, from the UE, the one or more PUCCH symbols.

17. The apparatus of claim 16, where each PUCCH symbol in the one or more PUCCH symbols corresponds to a time-domain entity with at least one of a cyclic prefix (CP) or a guard interval (GI).

18. The apparatus of claim 16, each PUCCH symbol of the one or more PUCCH symbols associated with the coherent PUCCH format includes one RS sample block and one data sample block that are separated by one gap sample block.

19. The apparatus of claim 16, where the at least one RS sample block is associated with a set of RSs, the at least one data sample block is associated with modulated samples, and the at least one gap sample block is associated with zero value or known value samples.

20. The apparatus of claim 16, wherein the at least one processor is further configured to transmit, to the UE, a configuration configuring at least one of:

a number of samples wherein each sample block in the at least one RS sample block, the at least one data sample block, or the at least one gap sample block;

an order for sample blocks among the at least one RS sample block, the at least one data sample block, or the at least one gap sample block; or a location of the one or more PUCCH symbols in a slot.

21. The apparatus of claim 16, where each sample block in the at least one RS sample block, the at least one data sample block, or the at least one gap sample block corresponds to a set of contiguous samples in the time-domain.

22. The apparatus of claim 16, where each data sample block in the at least one data sample block is associated with at least one corresponding RS sample block with one or more common spatial parameters that are used for channel estimation.

23. The apparatus of claim 22, where the at least one RS sample block, the at least one data sample block, or the at least one gap sample block include at least two sample blocks that are associated with different spatial parameters.

24. The apparatus of claim 16, where to receive the one or more PUCCH symbols, the at least one processor is configured to:

receive the one or more PUCCH symbols based on code division multiplexing (CDM) in the time-domain with PUCCH symbols from at least one second UE or from multiple ports of the UE.

25. The apparatus of claim 24, wherein the at least one processor is further configured to:

transmit a cover code for the CDM to the UE, wherein the cover code is orthogonal or nearly orthogonal in the time-domain.

26. The apparatus of claim 16, wherein the at least one processor is further configured to:

configure, for the UE, additional RS sample block allocations based on the UE sharing one or more locations of the at least one RS sample block with at least one second UE.

27. The apparatus of claim 16, wherein to receive the one or more PUCCH symbols, the at least one processor is configured to:

receive the one or more PUCCH symbols based on time division multiplexing (TDM) with PUCCH symbols from at least a second UE or from multiple ports of the UE.

28. A method of wireless communication at a network entity, comprising:

transmitting, for a user equipment (UE), an indication to transmit one or more physical uplink control channel (PUCCH) symbols that are associated with a coherent PUCCH format, wherein the coherent PUCCH format is associated with a set of time-domain single-carrier (SC) waveforms that does not use a discrete Fourier transform (DFT) or an inverse fast Fourier transform (IFFT), wherein each PUCCH symbol of the one or more PUCCH symbols associated with the coherent PUCCH format includes at least one reference signal (RS) sample block, at least one data sample block, or at least one gap sample block multiplexed in time-domain; and receiving, from the UE, the one or more PUCCH symbols.

* * * * *